(12) United States Patent
Kuen et al.

(10) Patent No.: US 11,941,884 B2
(45) Date of Patent: Mar. 26, 2024

(54) MULTI-SOURCE PANOPTIC FEATURE PYRAMID NETWORK

(71) Applicant: ADOBE INC., San Jose, CA (US)

(72) Inventors: Jason Wen Yong Kuen, Santa Clara, CA (US); Bo Sun, San Jose, CA (US); Zhe Lin, Clyde Hill, WA (US); Simon Su Chen, San Jose, CA (US)

(73) Assignee: ADOBE INC., San Jose, CA (US)

( * ) Notice: Subject to any disclaimer, the term of this patent is extended or adjusted under 35 U.S.C. 154(b) by 299 days.

(21) Appl. No.: 17/454,740

(22) Filed: Nov. 12, 2021

(65) Prior Publication Data

US 2023/0154185 A1 May 18, 2023

(51) Int. Cl.
| | |
|---|---|
| *G06K 9/00* | (2022.01) |
| *G06F 18/21* | (2023.01) |
| *G06N 3/08* | (2023.01) |
| *G06T 9/00* | (2006.01) |

(Continued)

(52) U.S. Cl.
CPC .......... *G06V 20/41* (2022.01); *G06F 18/2163* (2023.01); *G06N 3/08* (2013.01); *G06T 3/4046* (2013.01); *G06T 9/002* (2013.01); *G06V 10/751* (2022.01)

(58) Field of Classification Search
CPC .. G06V 20/41; G06V 10/751; G06F 18/2163; G06N 3/08; G06T 3/4046; G06T 9/002
See application file for complete search history.

(56) References Cited

U.S. PATENT DOCUMENTS

| 10,796,201 B2 * | 10/2020 | Li | G05D 1/0274 |
|---|---|---|---|
| 11,256,960 B2 * | 2/2022 | Lee | G06N 3/08 |
| 11,301,719 B2 * | 4/2022 | Zhan | G06V 30/19147 |

(Continued)

FOREIGN PATENT DOCUMENTS

| CN | 112990218 A * | 6/2021 | G06K 9/342 |
|---|---|---|---|
| CN | 113113119 A * | 7/2021 | G06K 9/342 |
| EP | 3985551 A1 * | 4/2022 | G06T 7/11 |

OTHER PUBLICATIONS

An Improved Encoder-Decoder Network for Ore Image Segmentation, Hao Yang et al., IEEE, 2021, pp. 11469-11475 (Year: 2021).*

(Continued)

*Primary Examiner* — Jayesh A Patel
(74) *Attorney, Agent, or Firm* — F. CHAU & ASSOCIATES, LLC

(57) ABSTRACT

Systems and methods for image processing are described. Embodiments of the present disclosure receive an image having a plurality of object instances; encode the image to obtain image features; decode the image features to obtain object features; generate object detection information based on the object features using an object detection branch, wherein the object detection branch is trained based on a first training set using a detection loss; generate semantic segmentation information based on the object features using a semantic segmentation branch, wherein the semantic segmentation branch is trained based on a second training set different from the first training set using a semantic segmentation loss; and combine the object detection information and the semantic segmentation information to obtain panoptic segmentation information that indicates which pixels of the image correspond to each of the plurality of object instances.

20 Claims, 14 Drawing Sheets

(51) Int. Cl.
*G06V 10/75* (2022.01)
*G06V 20/40* (2022.01)

(56) References Cited

U.S. PATENT DOCUMENTS

| | | | | |
|---|---|---|---|---|
| 11,640,714 | B2* | 5/2023 | Lee | G06V 10/764 382/100 |
| 11,823,443 | B2* | 11/2023 | Kuo | G06V 10/82 |
| 2021/0158043 | A1* | 5/2021 | Hou | G06V 10/454 |
| 2021/0326638 | A1* | 10/2021 | Lee | G06V 20/46 |
| 2021/0326656 | A1* | 10/2021 | Lee | G06F 18/217 |
| 2021/0357684 | A1* | 11/2021 | Amirghodsi | G06V 10/761 |
| 2022/0375090 | A1* | 11/2022 | Hwang | G06V 10/774 |
| 2022/0414869 | A1* | 12/2022 | Butler | G06V 10/454 |
| 2023/0104262 | A1* | 4/2023 | Lin | G06V 10/25 382/173 |
| 2023/0154005 | A1* | 5/2023 | Borse | G06T 7/10 382/100 |
| 2023/0252755 | A1* | 8/2023 | Min | G06T 5/50 382/100 |

OTHER PUBLICATIONS

One for All: A Mutual Enhancement Method for Object Detection and Semantic Segmentation, Shichao Zhang et al., MDPI, 2019, pp. 1-15 (Year: 2019).*
Real-time object detection and semantic segmentation for autonomous driving, Baojun Li et al., SPIE, 2017, pp. 1-9 (Year: 2017).*
Semantic Instance Segmentation with a Discriminative Loss Function, Bert De Brabandere et al., arXiv, 2017, pp. 1-10 (Year: 2017).*
Focal Loss Dense Detector for Vehicle Surveillance, Xiaoliang Wang et al., IEEE, 2018, pp. 1-5 (Year: 2018).*
Planoptic-DeepLab: A Simple, Strong, and Fast Baseline for Bottom-Up Panoptic Segmentation, Bowen Cheng et al., CVF, 2020, pp. 12475-12484 (Year: 2020).*
An Analysis of Pre-Training on Object Detection, Hengduo Li et al., arXiv, 2019, pp. 1-11 (Year: 2019).*
GridMask Data Augmentation, Pengguang Chen et al., arXiv, 2020, pp. 1-9 (Year: 2020).*
Panoptic Feature Pyramid Networks, Alexander Kirillov et al., CVF, 2019, pp. 6399-6408 (Year: 2019).*
UPSNet: A unified Panoptic Segmentation Network, Yuwen Xiong et al., arXiv, 2019, pp. 1-15 (Year: 2019).*
Real-Time Panoptic Segmentation from Dense Detections, Rui Hou, arXiv, 2020, pp. 1-12 (Year: 2020).*
Unifying Training and Inference for Panoptic Segmentation, Qizhu Li et al., arXiv, 2020, pp. 1-16 (Year: 2020).*
Kirillov, et al., "Panoptic Segmentation", Proceedings of the IEEE Conference on Computer Vision and Pattern Recognition, 2019, pp. 9404-9413.
Kirillov, et al., "Panoptic Feature Pyramid Networks", Proceedings of the IEEE Conference on Computer Vision and Pattern Recognition, 2019, pp. 6399-6408.
Blazarow, et al., "Learning Instance Occlusion for Panoptic Segmentation", Proceedings of the IEEE/CVF Conference on Computer Vision and Pattern Recognition, 2020, pp. 10720-10729.
Lin, et al., "Graph-guided Architecture Search for Real-time Semantic Segmentation", Proceedings of the IEEE/CVF Conference on Computer Vision and Pattern Recognition, 2020, pp. 4203-4212.
Chen, et al., "BANet: Bidirectional Aggregation Network with Occlusion Handling for Panoptic Segmentation", Proceedings of the IEEE/CVF Conference on Computer Vision and Pattern Recognition, 2020, pp. 3793-3802.

Wang, et al., "Pixel Consensus Voting for Panoptic Segmentation", Proceedings of the IEEE/CVF Conference on Computer Vision and Pattern Recognition, 2020, pp. 9464-9473.
Hou, et al., "Real-Time Panoptic Segmentation from Dense Detections", Proceedings of the IEEE/CVF Conference on Computer Vision and Pattern Recognition, arXiv preprint arXiv:1912.01202v3 [cs.CV] Apr. 3, 2020, 12 pages.
Wu, et al., "Bidirectional Graph Reasoning Network for Panoptic Segmentation", Proceedings of the IEEE/CVF Conference on Computer Vision and Pattern Recognition, 2020, pp. 9080-9089.
Cheng, et al., "Panoptic-DeepLab: A Simple, Strong, and Fast Baseline for Bottom-Up Panoptic Segmentation", Proceedings of the IEEE/CVF Conference on Computer Vision and Pattern Recognition, 2020, pp. 12475-12485.
Li, et al., "Unifying Training and Inference for Panoptic Segmentation", Proceedings of the IEEE/CVF Conference on Computer Vision and Pattern Recognition, arXiv preprint arXiv:2001.04982v2 [cs.CV] May 26, 2020, 16 pages.
Kuznetsova, et al., "The Open Images Dataset V4: Unified image classification, object detection, and visual relationship detection at scale", arXiv preprint arXiv:1811.00982v2 [cs.CV] Feb. 21, 2020, 26 pages.
Caesar, et al., "COCO-Stuff: Thing and Stuff Classes in Context", Proceedings of the IEEE Conference on Computer Vision and Pattern Recognition, 2018, pp. 1209-1218.
Lee, et al., "CenterMask : Real-Time Anchor-Free Instance Segmentation", Proceedings of the IEEE/CVF Conference on Computer Vision and Pattern Recognition, arXiv preprint arXiv:1911. 06667v6 [cs.CV] Apr. 2, 2020, 10 pages.
Lin, et al., "Microsoft COCO: Common Objects in Context", In European conference on computer vision, pp. 740-755, arXiv preprint arXiv:1405.0312v3 [cs.CV] Feb. 21, 2015, Springer.
Xiong, et al., "UPSNet: A Unified Panoptic Segmentation Network", In Proceedings of the IEEE Conference on Computer Vision and Pattern Recognition, pp. 8818-8826, arXiv preprint arXiv:1901. 03784v2 [cs.CV] Apr. 3, 2019.
Li, et al., "Attention-guided Unified Network for Panoptic Segmentation", In Proceedings of the IEEE Conference on Computer Vision and Pattern Recognition, pp. 7026-7035, 2019.
Gao, et al., "Learning Category- and Instance-Aware Pixel Embedding for Fast Panoptic Segmentation", arXiv preprint arXiv:2009. 13342v2 [cs.CV] Jun. 16, 2021, 11 pages.
Sofiiuk, et al., "AdaptIS: Adaptive Instance Selection Network", In Int. Conf. Comput. Vis., pp. 7355-7363, arXiv preprint arXiv:1909. 07829v1 [cs.CV] Sep. 17, 2019.
Wang, et al., "Axial-DeepLab: Stand-Alone Axial-Attention for Panoptic Segmentation", In Eur. Conf. Comput. Vis., 2020, 19 pages.
Wu, et al., "Auto-Panoptic: Cooperative Multi-Component Architecture Search for Panoptic Segmentation", Advances in Neural Information Processing Systems, 33, arXiv preprint arXiv:2010. 16119v1 [cs.CV] Oct. 30, 2020, 12 pages.
Cordts, et al., "The Cityscapes Dataset for Semantic Urban Scene Understanding", In Proceedings of the IEEE conference on computer vision and pattern recognition, pp. 3213-3223, 2016.
Neuhold, et al., "The Mapillary Vistas Dataset for Semantic Understanding of Street Scenes", In Proceedings of the IEEE International Conference on Computer Vision, pp. 4990-4999, 2017.
Zhang, et al., "Bridging the Gap Between Anchor-based and Anchor-free Detection via Adaptive Training Sample Selection", In Proceedings of the IEEE/CVF Conference on Computer Vision and Pattern Recognition, pp. 9759-9768, arXiv preprint arXiv:1912. 02424v4 [cs.CV] Jun. 20, 2020.
Chen, et al. "GridMask Data Augmentation", arXiv preprint arXiv:2001. 04086v2 [cs.CV] Jan. 14, 2020, 9 pages.

* cited by examiner

MULTI-SOURCE PANOPTIC FEATURE PYRAMID NETWORK

BACKGROUND

The following relates generally to image processing, and more specifically to panoptic segmentation using machine learning.

Digital image processing refers to the use of a computer to edit a digital image using an algorithm or a processing network. In some examples, an image may be processed using image processing software. Image processing may include identification of the content of an image using a machine learning model. In some cases, computer vision tasks such as recognition, object classification, detection and segmentation may be unified into a single comprehensive task to leverage possible complementarity. For example, semantic segmentation may be a task for detecting all pixels in a scene, and instance segmentation may be a task to delineate objects in defined classes. The "panoptic segmentation" task involves both semantic segmentation and instance segmentation to detect and delineate every visible object and region in the scene.

Recently, neural networks have been used for image segmentation. However, conventional systems are trained for either semantic segmentation or instance segmentation on a single dataset. Hence, detection and segmentation are both limited to a relatively small number of "thing" or "stuff" categories, respectively. Therefore, there is a need in the art for improved segmentation systems that are robust and scalable to large semantic and instance datasets for panoptic segmentation.

SUMMARY

The present disclosure describes systems and methods for image processing. Embodiments of the disclosure provide a panoptic segmentation apparatus trained using machine learning to locate panoptic segmentation information based on an input image. A multi-source panoptic feature pyramid network (FPN) architecture enables training an object detection branch, semantic segmentation branch, and an instance segmentation branch on different multiple datasets. As a result, the panoptic segmentation apparatus can identify and segment a large number of background stuff and foreground thing objects in an image. In some examples, an object detection backbone network and shared decoding heads can integrate and align object detection, semantic segmentation, and instance segmentation.

A method, apparatus, and non-transitory computer readable medium for training a neural network are described. One or more embodiments of the method, apparatus, and non-transitory computer readable medium include encoding a first image from a first training set to obtain first image features, wherein the first training set includes ground truth object detection information corresponding to the first image; decoding the first image features to obtain first object features using a shared decoder; generating object detection information based on the first object features using an object detection branch; comparing the object detection information with the ground truth object detection information to obtain an object detection loss; updating parameters of the object detection branch based on the object detection loss; encoding a second image from a second training set to obtain second image features, wherein the second training set includes ground truth semantic segmentation information corresponding to the second image; decoding the second image features to obtain second object features using the shared decoder; generating semantic segmentation information based on the second object features using a semantic segmentation branch; comparing the semantic segmentation information with the ground truth semantic segmentation information to obtain a semantic segmentation loss; and updating parameters of the semantic segmentation branch based on the semantic segmentation loss.

A method, apparatus, and non-transitory computer readable medium for image processing are described. One or more embodiments of the method, apparatus, and non-transitory computer readable medium include receiving an image comprising a plurality of object instances; encoding the image to obtain image features; decoding the image features to obtain object features; generating object detection information based on the object features using an object detection branch, wherein the object detection branch is trained based on a first training set using a detection loss; generating semantic segmentation information based on the object features using a semantic segmentation branch, wherein the semantic segmentation branch is trained based on a second training set different from the first training set using a semantic segmentation loss; and combining the object detection information and the semantic segmentation information to obtain panoptic segmentation information that indicates which pixels of the image correspond to each of the plurality of object instances.

An apparatus and method for image processing are described. One or more embodiments of the apparatus and method include an image encoder configured to encode an image to obtain image features; a shared decoder configured to decode the image features to obtain object features; an object detection branch configured to generate object detection information based on the object features, wherein the object detection branch is trained based on a first training set using a detection loss; and a semantic segmentation branch configured to generate semantic segmentation information based on the object features, wherein the semantic segmentation branch is trained based on a second training set different from the first training set using a semantic segmentation loss.

DETAILED DESCRIPTION

Figure 1:
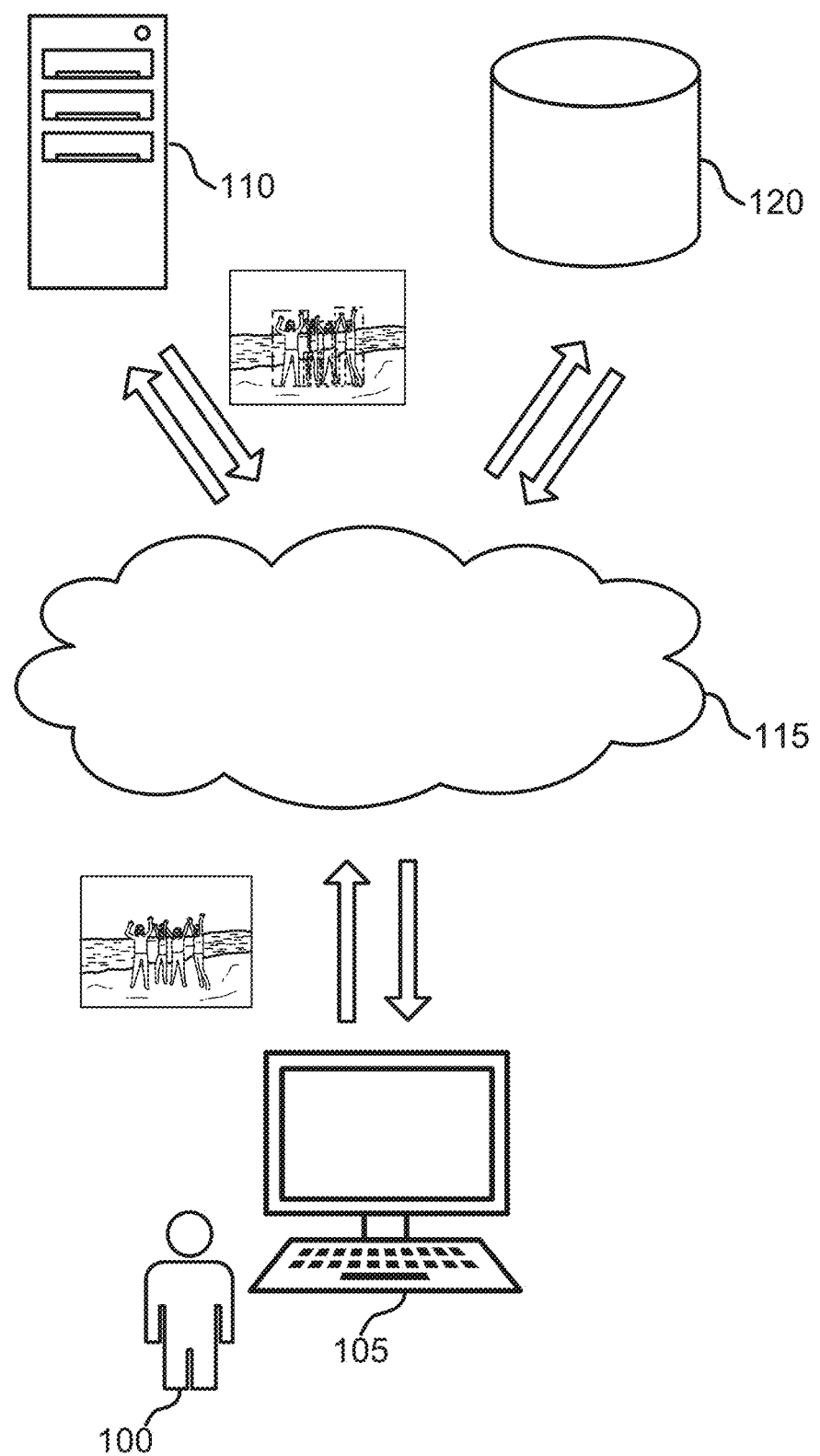
FIG. 1 shows an example of an image processing system according to aspects of the present disclosure.

The present disclosure describes systems and methods for image processing. Embodiments of the disclosure provide a panoptic segmentation apparatus trained using machine learning to locate panoptic segmentation information based on an input image. A multi-source panoptic feature pyramid network (FPN) architecture enables training an object detection branch, semantic segmentation branch, and an instance segmentation branch on multiple datasets. As a result, the panoptic segmentation apparatus can identify and segment a large number of background stuff and foreground thing objects in an image. In some examples, an object detection backbone network and shared decoding heads can integrate and align object detection, semantic segmentation, and instance segmentation.

In some embodiments, the object detection branch and instance segmentation branch are trained on a first training dataset using supervised learning. The semantic segmentation branch is trained on a second training dataset, where the second training dataset is different from the first training dataset.

Panoptic segmentation systems combine the tasks of semantic segmentation and instance segmentation. In some cases, panoptic segmentation assigns a class label to each pixel and detects and segments each object instance. Recently, systems such as Mask R-CNN may be used for panoptic segmentation tasks. Mask R-CNN includes instance segmentation and semantic segmentation where they share a feature pyramid network backbone. However, conventional panoptic segmentation systems are trained on a single-source dataset and fail to handle a large number of background classes and instance categories.

Embodiments of the present disclosure include a panoptic segmentation apparatus that applies a multi-source panoptic feature pyramid network to segment and identify background classes and instance categories in an image. The panoptic segmentation network includes an object detection branch, a semantic (stuff) segmentation, and an instance segmentation branch where one or more of these branches are trained on different datasets. As a result, the panoptic segmentation apparatus can identify a relatively large background stuff classes and foreground thing categories for an image. In some examples, two or more of the branches (e.g., the object detection branch and the instance segmentation branch) can be trained together using a dataset that includes both types of annotation information.

In some examples, the instance segmentation branch and semantic segmentation branch share parameters with an object detector. An FPN is used to encode an image to obtain image features. Object features may be extracted using a shared decoding head for object detection and segmentation.

In some examples, batch statistics from the detection data samples may be used for subsequent normalization of segmentation data samples.

By applying an unconventional multi-source training method for both an instance segmentation branch and a semantic segmentation branch, embodiments of the present disclosure provide a generalized and robust model that can handle large numbers of background classes and object instances in images. In some examples, the object detection branch and the instance segmentation branch are trained from a first training set (e.g., Open Images dataset). The semantic segmentation branch is trained from a second training set (e.g., COCO stuff dataset), where the second training set is different from the first training set.

Embodiments of the present disclosure may be used in the context of computer vision applications. For example, a panoptic segmentation network based on the present disclosure may take an input image and efficiently identify and segment instances and semantics of the image for subsequent user manipulation. An example application of the inventive concept in the image segmentation context is provided with reference to FIGS. 1-4. Details regarding the architecture of an example panoptic segmentation apparatus are provided with reference to FIGS. 5-6. An example of a process for panoptic segmentation is provided with reference to FIGS. 7-11. A description of an example training process is described with reference to FIG. 12-14.

Image Segmentation Application

FIG. 1 shows an example of an image processing system according to aspects of the present disclosure. The example shown includes user 100, user device 105, panoptic segmentation apparatus 110, cloud 115, and database 120. Panoptic segmentation apparatus 110 is an example of, or includes aspects of, the corresponding element described with reference to FIG. 5.

In the example of FIG. 1, user 100 selects an image. In some examples, the image includes both foreground things (e.g., "person" object) and background stuff (e.g., sea, sky). User 100 is interested in identifying and segmenting foreground things and background stuff for subsequent manipulation. User 100 can change the skin tone of a particular person or change the contrast or color of background sky. The user 100 communicates with panoptic segmentation apparatus 110 via the user device 105 and the cloud 115. The user device 105 transmits the image to the panoptic segmentation apparatus 110 to identify combined panoptic segmentation information.

The user device 105 may be a personal computer, laptop computer, mainframe computer, palmtop computer, personal assistant, mobile device, or any other suitable processing apparatus. In some examples, the user device 105 includes software that incorporates a panoptic segmentation application (e.g., an image editing application). The image editing application may either include or communicate with the panoptic segmentation apparatus 110.

A user interface may enable a user 100 to interact with a user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device 105 and rendered locally by a browser.

The panoptic segmentation apparatus 110 receives an image including a set of object instances and encodes the image to obtain image features. The panoptic segmentation apparatus 110 decodes the image features to obtain object features. An object detection branch of the panoptic segmentation apparatus 110 generates object detection information based on the object features, where the object detection branch is trained based on a first training set using a detection loss. A semantic segmentation branch of the panoptic segmentation apparatus 110 generates semantic segmentation information based on the object features, where the semantic segmentation branch is trained based on a second training set different from the first training set using a semantic segmentation loss.

The panoptic segmentation apparatus 110 combines the object detection information and the semantic segmentation information to obtain panoptic segmentation information that indicates which pixels of the image correspond to each of the object instances. The panoptic segmentation apparatus 110 returns the image having the panoptic segmentation information to user 100. The process of using the panoptic segmentation apparatus 110 to perform panoptic segmentation is further described with reference to FIG. 2.

The panoptic segmentation apparatus 110 includes a computer implemented network comprising an image encoder, a shared decoder, an object detection branch, a semantic segmentation branch, and an instance segmentation branch, where these components/networks will be described in greater detail in FIG. 5. The panoptic segmentation apparatus 110 receives an image including a set of object instances; encodes the image to obtain image features; decodes the image features to obtain object features; generates object detection information based on the object features using an object detection branch, wherein the object detection branch is trained based on a first training set using a detection loss; generates semantic segmentation information based on the object features using a semantic segmentation branch, wherein the semantic segmentation branch is trained based on a second training set different from the first training set using a semantic segmentation loss; and combines the object detection information and the semantic segmentation information to obtain panoptic segmentation information that indicates which pixels of the image correspond to each of the plurality of object instances.

The panoptic segmentation apparatus 110 may also include a processor unit, a memory unit, an I/O module, and a training component. The training component is used to train a machine learning model (or a panoptic segmentation network). Additionally, the panoptic segmentation detection apparatus 110 can communicate with the database 120 via the cloud 115. In some cases, the architecture of the panoptic segmentation network is also referred to as a network or a network model. Further detail regarding the architecture of the panoptic segmentation apparatus 110 is provided with reference to FIGS. 5-6. Further detail regarding the operation of the panoptic segmentation apparatus 110 is provided with reference to FIGS. 7-11.

In some cases, panoptic segmentation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
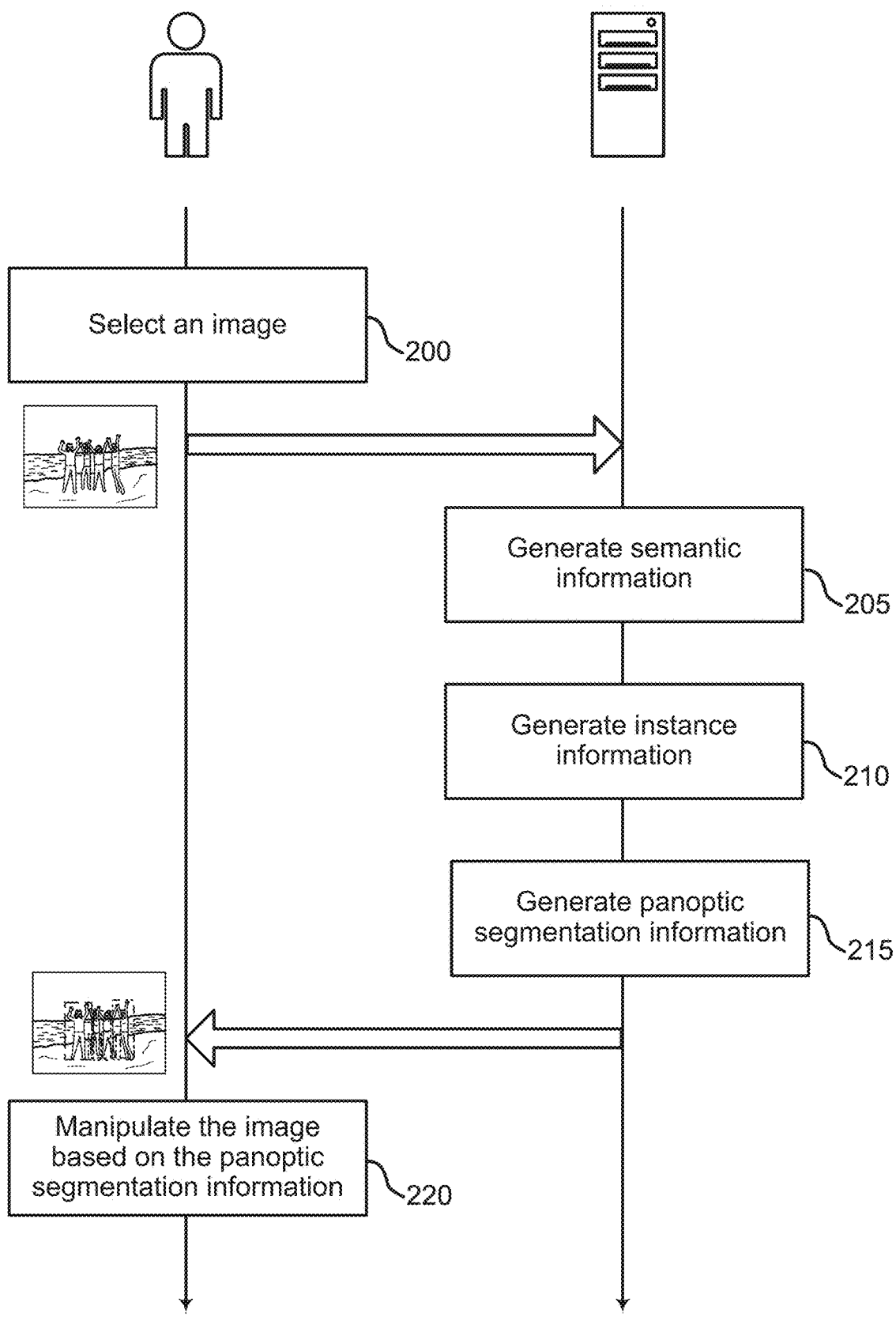
FIG. 2 shows an example of panoptic segmentation according to aspects of the present disclosure.

FIG. 2 shows an example of panoptic segmentation according to aspects of the present disclosure. The panoptic segmentation apparatus in FIG. 1 can be used to generate panoptic segmentation information based on an input image selected by a user. In some examples, a user is interested in identifying and segmenting semantic information (stuff classes) and instance information (things categories) based on the input image for subsequent image editing. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user selects an image. In some cases, the operations of this step refer to, or may be performed by, a user via a user device as described with reference to FIG. 1. For example, the user may provide the original image 400 shown in FIG. 4.

At operation 205, the system generates semantic information based on the image. In some cases, the operations of this step refer to, or may be performed by, a panoptic segmentation apparatus as described with reference to FIGS. 1 and 5. The semantic information may differentiate between foreground things and background stuff for each pixel in the original image (e.g., by identifying stuff classes such as person, sand or water). In some examples, person is considered foreground or instance categories. A first person may be identified as a different instance than a second person in the same image.

At operation 210, the system generates instance information based on the image. The instance image may differentiate between different foreground objects (e.g., by identifying different instances of people and motorcycle, see an example image in FIG. 3). In some cases, the operations of this step refer to, or may be performed by, a panoptic segmentation apparatus as described with reference to FIGS. 1 and 5.

At operation 215, the system generates panoptic segmentation information based on the semantic information and the instance information. For example, the panoptic segmentation information may be in the form of one or more image masks and image labels indicating pixels associated with different foreground and background classes. In some cases, the operations of this step refer to, or may be performed by, a panoptic segmentation apparatus as described with reference to FIGS. 1 and 5.

At operation 220, the user manipulates the image based on the panoptic segmentation information. In some cases, the operations of this step refer to, or may be performed by, a user as described with reference to FIG. 1. For example, the user may select pixels associated with a particular person among several persons and change the skin tone of that person, or change the color of background (e.g., stuff such as sky, tree, pavement, see FIG. 3). In some cases, the operations of this step refer to, or may be performed by, a user as described with reference to FIG. 1.

Figure 3:
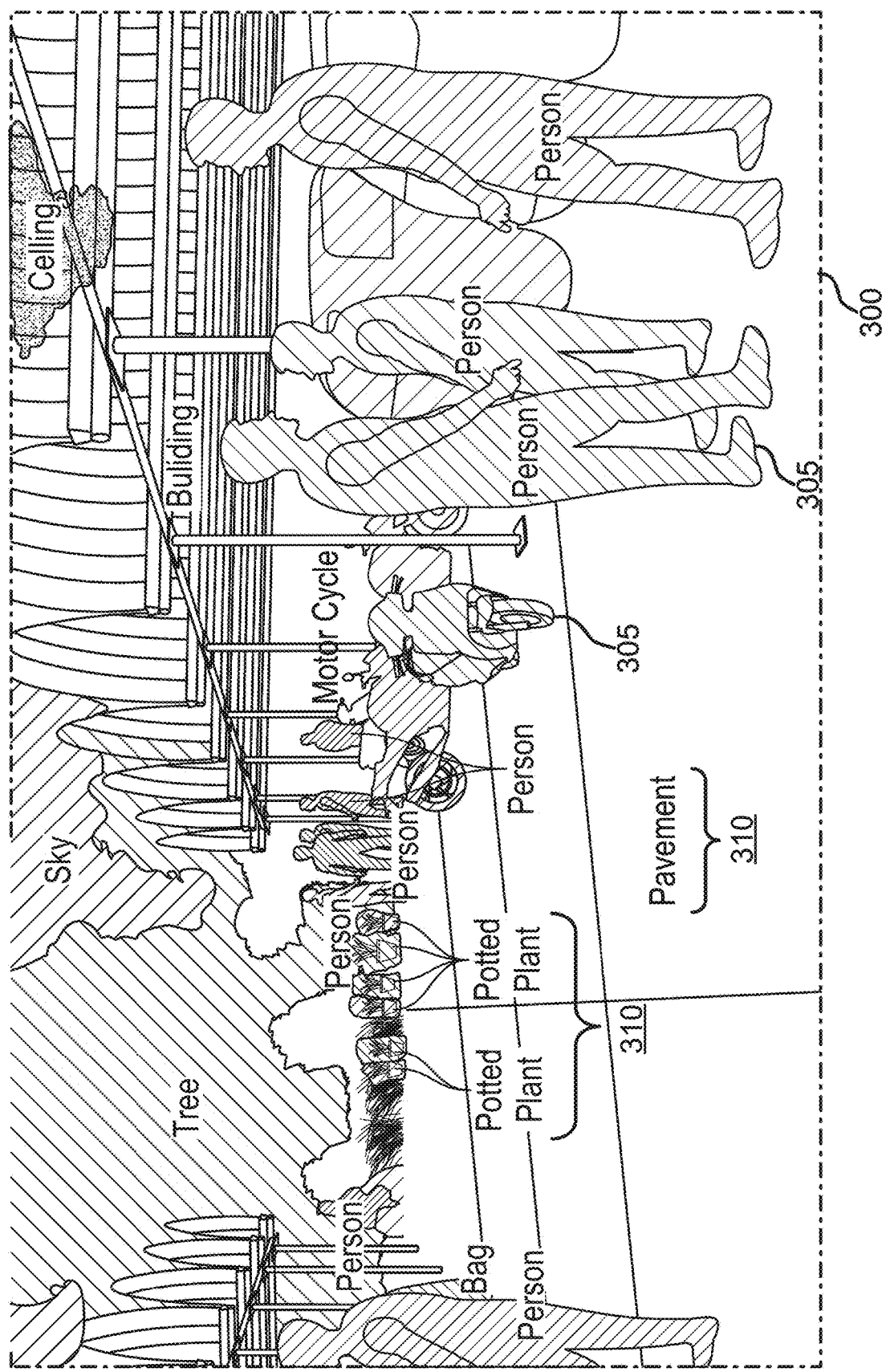
FIG. 3 shows an example of an image having segmentation information according to aspects of the present disclosure.

FIG. 3 shows an example of an image including panoptic segmentation information according to aspects of the present disclosure. Panoptic segmentation information combines semantic segmentation and instance segmentation. The example shown includes image 300, object 305, and object label 310. In some examples, the pixels are uniquely assigned to one of the background classes (i.e., stuff) or one of the object instances (i.e., things).

Image segmentation takes an original image 300 and locates objects 305 and boundaries in the image 300. In some cases, segmentation distinguishes different objects 305 and identifies separate instances of each kind of object of the image 300. Panoptic segmentation assigns a semantic label and an instance id to each pixel of an image 300. Pixels with the same label are considered of the same class and the instance id's differentiate the corresponding instances.

Embodiments of the present disclosure include a multi-source panoptic feature pyramid network (also referred to as MS-Panoptic FPN) that can handle a large number of thing and stuff categories. The network model is configured to segment and identify each object 305 and stuff category in an image 300. For example, the network model can segment and identify each person and motorcycle in a street-scene image. Additionally, the network model can segment and recognize sky, tree, ground, etc. in the image 300. In some embodiments, detection, stuff segmentation, and instance segmentation are trained or performed jointly. The network model includes an instance segmentation branch and a stuff segmentation branch and a detector. In some examples, the detector and instance segmentation branch are trained on Open Images dataset and the stuff segmentation branch is trained on COCO stuff dataset.

As an example illustrated in FIG. 3, the network model can identify object 305 such as person and motorcycle from the image 300. The network model then predicts and assigns object label 310 to the identified objects (e.g., plant, pavement).

Figure 4:
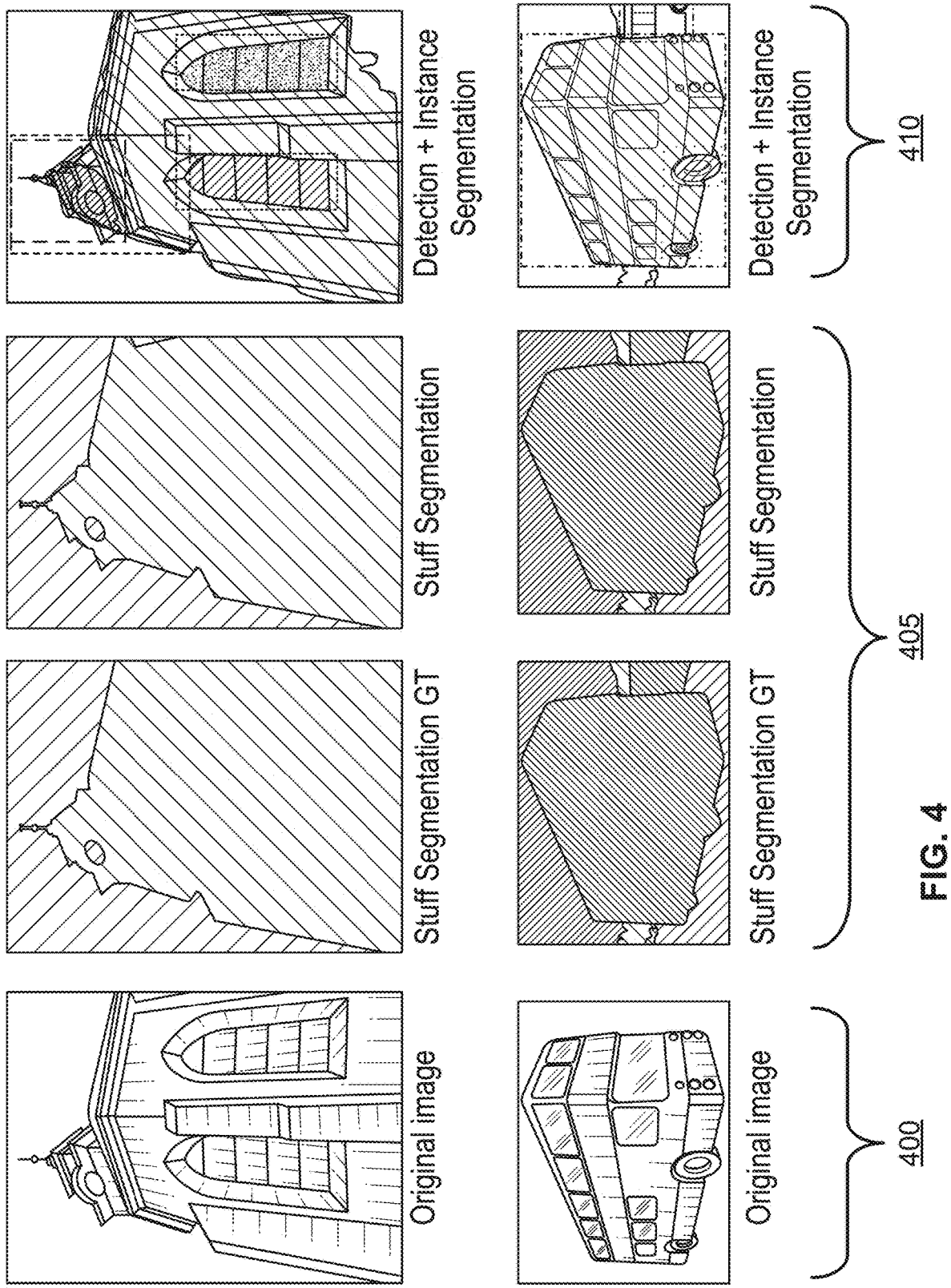
FIG. 4 shows an example of instance segmentation and semantic segmentation according to aspects of the present disclosure.

FIG. 4 shows an example of instance segmentation and semantic segmentation according to aspects of the present disclosure. The panoptic segmentation task provides a unified result for the foreground "things" and the background "stuff" (i.e., via instance segmentation and semantic segmentation). A baseline panoptic segmentation network may involve training the two sub-tasks separately and then fusing the results by heuristic rules. The example shown includes image 400, semantic segmentation 405, and detection and instance segmentation 410.

In some cases, computer vision tasks such as recognition, object classification, detection and segmentation may be unified into a single comprehensive task to leverage complementarity. For example, semantic segmentation 405 is a task for detecting all pixels in a scene, and instance segmentation is a task to delineate objects in defined classes. "Panoptic segmentation" involves both semantic segmentation 405 and instance segmentation to detect and delineate every visible object and region in the scene.

According to some embodiments of the present disclosure, the network model includes an object detector, semantic segmentation branch, and instance segmentation branch combined together for performing panoptic segmentation. An end-to-end learning method may be used to train a panoptic segmentation network. In some examples, the detector and instance segmentation branch are trained on a first training set (e.g., Open Images dataset) and the stuff segmentation branch is trained on a second training set (e.g., COCO stuff dataset).

An instance segmentation task focuses on identifying "things" in an image 400. Specifically, the task includes identifying both the semantic class and instance id of each foreground object. Instance segmentation methods can be categorized into two groups, i.e., segmentation-based and region-based methods. Segmentation-based methods produce a semantic segmentation map and then attempt to divide the pixels of each category into different instances. Region-based methods may incorporate a two-step R-CNN framework. Specifically, region-based methods may first generate region proposals and then predict instance masks.

A semantic segmentation task identifies different kinds of "stuff" in an image based on, for example, a neural network such as a fully convolutional neural network. Semantic segmentation 405 may also capture and utilize contextual information. Low-level and high-level semantic features may be fused to utilize different scale contexts. For example, stacking dilated convolutions may enlarge the receptive field while preserving the resolution. A deformable convolution may then generalize the dilated convolution. In some cases, a channel attention mechanism may be used to capture the global context. Additionally, adaptive context may be captured based on non-local pixel-wise relations.

In some examples, an objective function may be used to enforce thing and stuff consistency. In some embodiments, a panoptic segmentation network may be based on a panoptic FPN.

Network Architecture

Figure 5:
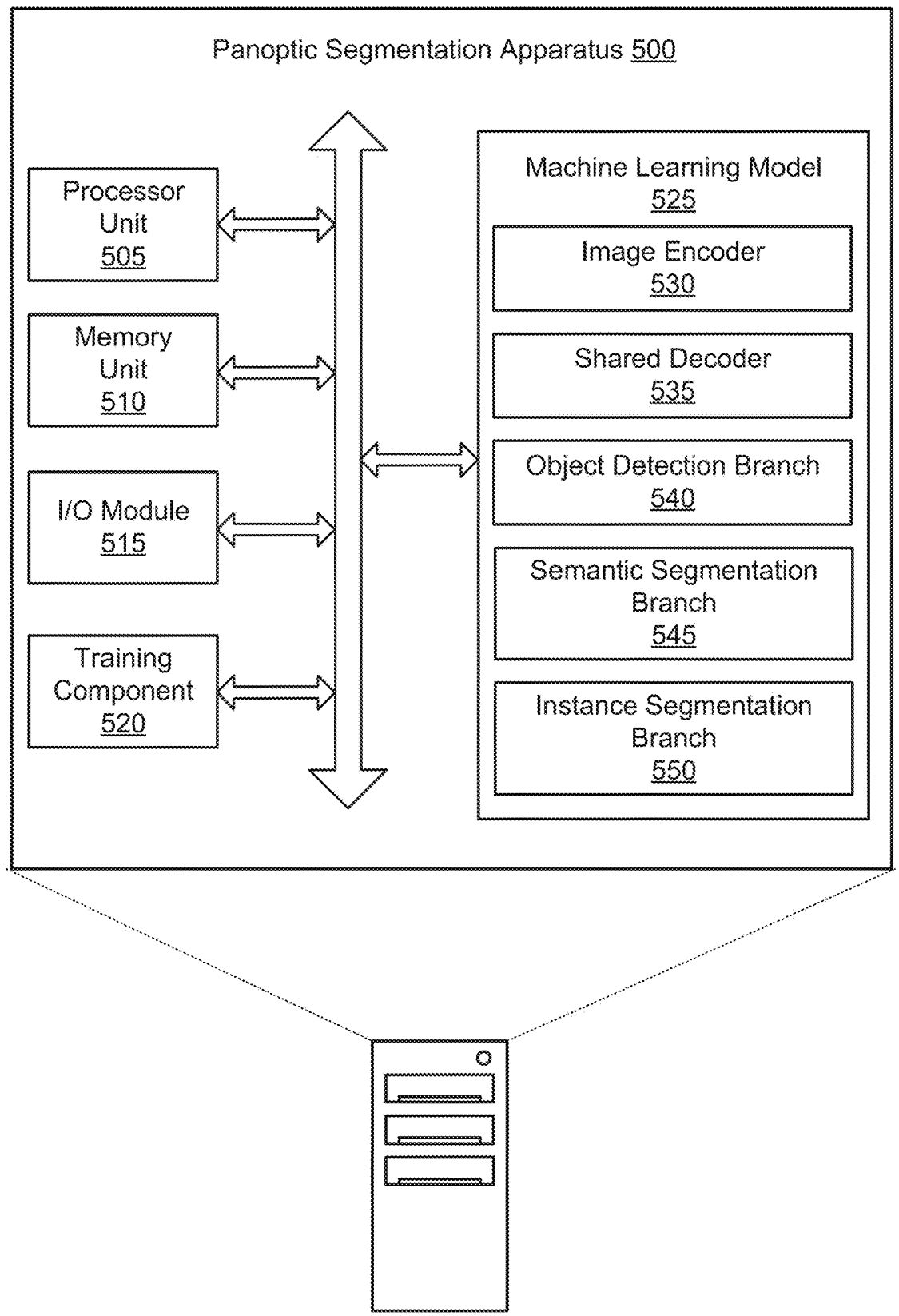
FIG. 5 shows an example of a panoptic segmentation apparatus according to aspects of the present disclosure.
Figure 6:
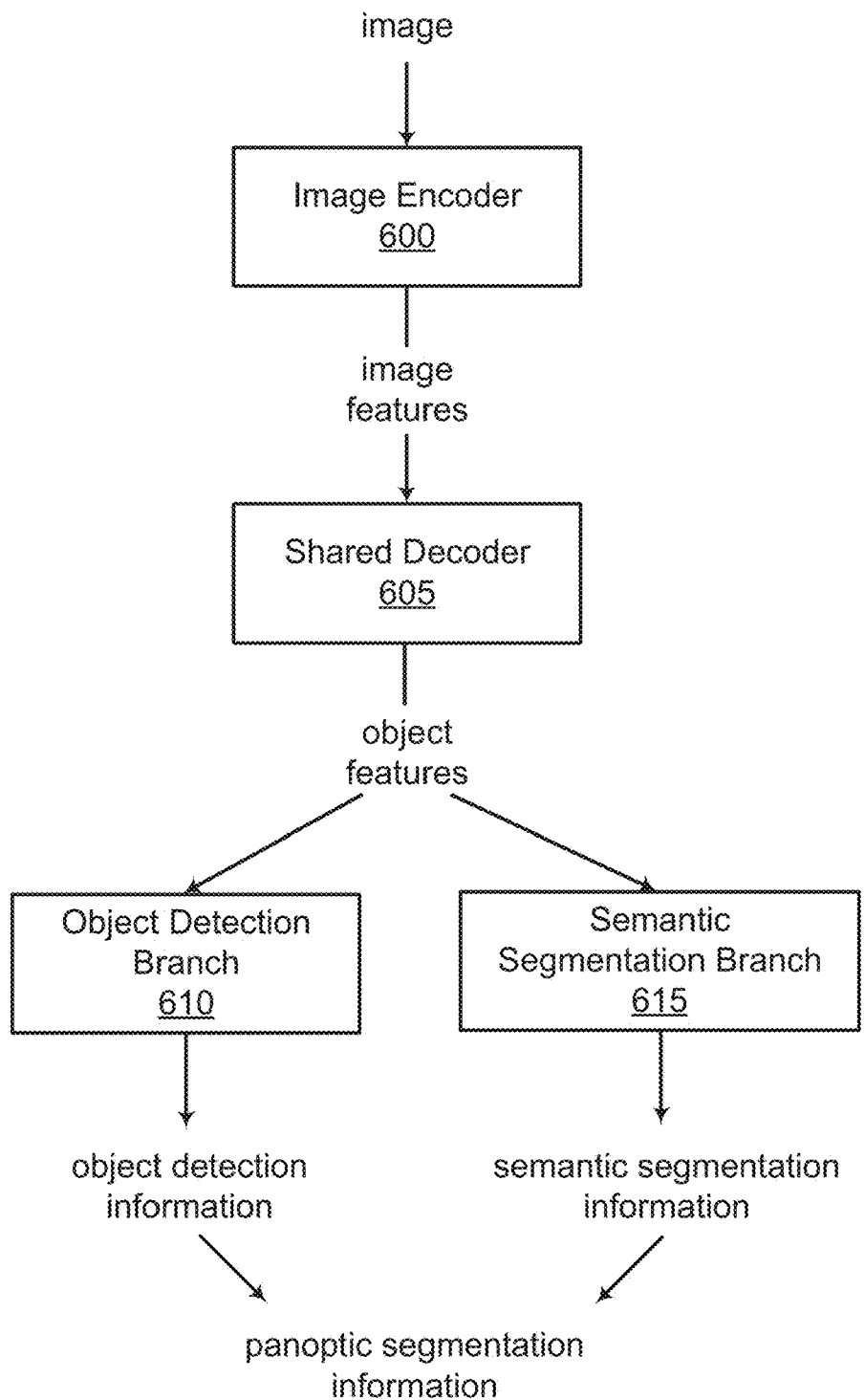
FIG. 6 shows an example of a panoptic segmentation diagram according to aspects of the present disclosure.

In FIGS. 5-6, an apparatus and method for image processing are described. One or more embodiments of the apparatus and method include an image encoder configured to encode an image to obtain image features; a shared decoder configured to decode the image features to obtain object features; an object detection branch configured to generate object detection information based on the object features, wherein the object detection branch is trained based on a first training set using a detection loss; and a semantic segmentation branch configured to generate semantic segmentation information based on the object features, wherein the semantic segmentation branch is trained based on a second training set different from the first training set using a semantic segmentation loss.

Some examples of the apparatus and method further include an instance segmentation branch configured to generate instance segmentation information based on the object features, wherein the instance segmentation branch is trained using a focal loss. In some examples, the object detection branch comprises an object classification layer, a center detection layer, and a bounding box regression layer. In some examples, the image encoder comprises an FPN.

FIG. 5 shows an example of a panoptic segmentation apparatus according to aspects of the present disclosure. The example shown includes panoptic segmentation apparatus 500 that includes processor unit 505, memory unit 510, I/O module 515, training component 520, and machine learning model 525. Machine learning model 525 further includes image encoder 530, shared decoder 535, object detection branch 540, semantic segmentation branch 545, and instance segmentation branch 550. Panoptic segmentation apparatus 500 is an example of, or includes aspects of, the corresponding element described with reference to FIG. 1.

A processor unit 505 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 505 is configured to operate a memory array using a memory controller. In other cases, a memory controller is integrated into the processor. In some cases, the processor unit 505 is configured to execute computer-readable instructions stored in a memory to perform various functions. In some embodiments, a processor unit 505 includes special purpose components for modem processing, baseband processing, digital signal processing, or transmission processing.

Examples of a memory unit 510 include random access memory (RAM), read-only memory (ROM), or a hard disk. Examples of memory unit 510 include solid state memory and a hard disk drive. In some examples, a memory unit 510 is used to store computer-readable, computer-executable software including instructions that, when executed, cause a processor to perform various functions described herein. In some cases, the memory unit 510 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 510 store information in the form of a logical state.

I/O module 515 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 515 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, the panoptic segmentation apparatus 500 includes a computer implemented artificial neural network (ANN) for image segmentation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In an embodiment, the panoptic segmentation apparatus 500 includes a convolutional neural network (CNN). CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 520 compares the object detection information with the ground truth object detection information to obtain an object detection loss. Training component 520 updates parameters of the object detection branch 540 based on the object detection loss. Training component 520 compares the semantic segmentation information with the ground truth semantic segmentation information to obtain a semantic segmentation loss, and updates parameters of the semantic segmentation branch 545 based on the semantic segmentation loss. In some examples, training component 520 updates parameters of a shared decoder 535 based on the object detection loss. In some examples, training component 520 updates parameters of the shared decoder 535 based on the semantic segmentation loss.

In some examples, training component 520 compares the generated instance segmentation information with ground truth instance segmentation information to obtain an instance segmentation loss. In some examples, training component 520 updates parameters of the instance segmentation branch 550 based on the instance segmentation loss. In some examples, the third image and the ground truth instance information are from the first training set. In some examples, training component 520 updates parameters of the shared decoder 535 based on the instance segmentation loss. In some examples, training component 520 compares the additional object detection information and the additional semantic segmentation information with the ground truth panoptic segmentation information to obtain a panoptic segmentation loss. In some examples, training component 520 updates the parameters of the object detection branch 540 and the semantic segmentation branch 545 based on the panoptic segmentation loss.

According to some embodiments, machine learning model 525 receives an image including a set of object instances. Machine learning model 525 combines the object detection information and the semantic segmentation information to obtain panoptic segmentation information that indicates which pixels of the image correspond to each of the set of object instances. In some examples, machine learning model 525 receives a search query indicating an object corresponding to an object instance of the set of object instances. Then, an image is retrieved in response to the search query based on the panoptic segmentation information.

In some examples, machine learning model 525 presents the image and at least a portion of the panoptic segmentation information corresponding to the object instance for display. In some examples, machine learning model 525 receives a selection command corresponding to an object instance of the set of object instances. Machine learning model 525 receives an edit command. In some examples, machine learning model 525 edits the pixels corresponding to the object instance based on the edit command.

According to some embodiments, image encoder 530 encodes a first image from a first training set to obtain first image features, where the first training set includes ground truth object detection information corresponding to the first image. Image encoder 530 encodes a second image from a second training set to obtain second image features, where the second training set includes ground truth semantic segmentation information corresponding to the second image. In some examples, image encoder 530 encodes a third image to obtain third image features. In some examples, image encoder 530 encodes a fourth image from a fourth training set to obtain fourth image features, where the fourth training set includes ground truth panoptic segmentation information corresponding to the fourth image.

Thus, according to some embodiments, image encoder 530 is configured to encode an image to obtain image features. In some examples, the image encoder 530 includes an FPN. Image encoder 530 is an example of, or includes aspects of, the corresponding element described with reference to FIGS. 6 and 8-11.

According to some embodiments, shared decoder 535 decodes the first image features to obtain first object features. In some examples, shared decoder 535 decodes the second image features to obtain second object features. In some examples, shared decoder 535 decodes the third image features to obtain third object features. In some examples, shared decoder 535 decodes the fourth image features to obtain fourth object features. According to some embodiments, shared decoder 535 is configured to decode the image features to obtain object features. Shared decoder 535 is an example of, or includes aspects of, the corresponding element described with reference to FIG. 6.

According to some embodiments, object detection branch 540 generates object detection information based on the first object features. In some examples, the object detection information includes object classification information, object center information, and bounding box information. In some examples, the ground truth object detection information from the first training set is based on a set of object categories. In some examples, object detection branch 540 generates additional object detection information based on the fourth object features.

According to some embodiments, object detection branch 540 generates object detection information based on the object features, where the object detection branch 540 is trained based on a first training set using a detection loss. According to some embodiments, object detection branch 540 is configured to generate object detection information based on the object features, wherein the object detection branch 540 is trained based on a first training set using a detection loss. In some examples, the object detection branch 540 includes an object classification layer, a center detection layer, and a bounding box regression layer. Object detection branch 540 is an example of, or includes aspects of, the corresponding element described with reference to FIGS. 6 and 8.

According to some embodiments, semantic segmentation branch 545 generates semantic segmentation information based on the second object features using a semantic segmentation branch 545. In some examples, the semantic segmentation information indicates a stuff category corresponding to individual pixels of the second image. In some examples, the ground truth semantic segmentation information includes information that is based on a set of stuff categories. In some examples, semantic segmentation branch 545 generates additional semantic segmentation information based on the fourth object features using the semantic segmentation branch 545.

According to some embodiments, semantic segmentation branch 545 generates semantic segmentation information based on the object features, where the semantic segmentation branch 545 is trained based on a second training set different from the first training set using a semantic segmentation loss. Semantic segmentation branch 545 is an example of, or includes aspects of, the corresponding element described with reference to FIG. 9.

According to some embodiments, instance segmentation branch 550 generates instance segmentation information based on the third object features. In some examples, instance segmentation branch 550 generates additional instance segmentation information based on the fourth object features, where the panoptic segmentation loss is based on the additional instance segmentation information.

According to some embodiments, instance segmentation branch 550 selects pixels corresponding the object instance based on the selection command. In some examples, instance segmentation branch 550 generates instance segmentation information based on the object features, where the instance segmentation branch 550 is trained using a focal loss. Instance segmentation branch 550 is an example of, or includes aspects of, the corresponding element described with reference to FIG. 10.

FIG. 6 shows an example of a panoptic segmentation diagram according to aspects of the present disclosure. The panoptic segmentation diagram of FIG. 6 shows the relationship between networks/elements of the panoptic segmentation apparatus described with reference to FIG. 5. The example shown includes image encoder 600, shared decoder 605, object detection branch 610, and semantic segmentation branch 615.

According to an embodiment of the present disclosure, image encoder 600 receives an image including a set of object instances. Image encoder 600 encodes the image to obtain image features. Image encoder 600 is an example of, or includes aspects of, the corresponding element described with reference to FIGS. 5 and 8-11.

Shared decoder 605 decodes the image features to obtain object features. Shared decoder 605 is an example of, or includes aspects of, the corresponding element described with reference to FIG. 5.

Object detection branch 610 generates object detection information based on the object features, where the object detection branch 610 is trained based on a first training set using a detection loss. Object detection branch 610 is an example of, or includes aspects of, the corresponding element described with reference to FIGS. 5 and 8.

Semantic segmentation branch 615 generates semantic segmentation information based on the object features, where the semantic segmentation branch 615 is trained based on a second training set different from the first training set using a semantic segmentation loss. Semantic segmentation branch 615 is an example of, or includes aspects of, the corresponding element described with reference to FIGS. 5 and 9.

The panoptic segmentation apparatus (shown in FIG. 5) combines the object detection information and the semantic segmentation information to obtain panoptic segmentation information that indicates which pixels of the image correspond to each of the set of object instances.

Inference

In FIGS. 7-11, a method, apparatus, and non-transitory computer readable medium for image processing are described. One or more aspects of the method, apparatus, and non-transitory computer readable medium include receiving an image comprising a plurality of object instances; encoding the image to obtain image features; decoding the image features to obtain object features; generating object detection information based on the object features using an object detection branch, wherein the object detection branch is trained based on a first training set using a detection loss; generating semantic segmentation information based on the object features using a semantic segmentation branch, wherein the semantic segmentation branch is trained based on a second training set different from the first training set using a semantic segmentation loss; and combining the object detection information and the semantic segmentation information to obtain panoptic segmentation information that indicates which pixels of the image correspond to each of the plurality of object instances.

Some examples of the method, apparatus, and non-transitory computer readable medium further include receiving a search query indicating an object corresponding to an object instance of the plurality of object instances. Some examples further include retrieving the image in response to the search query based on the panoptic segmentation information. Some examples further include presenting the image and at least a portion of the panoptic segmentation information corresponding to the object instance for display.

Some examples of the method, apparatus, and non-transitory computer readable medium further include receiving a selection command corresponding to an object instance of the plurality of object instances. Some examples further include selecting pixels corresponding the object instance based on the selection command. Some examples further include receiving an edit command. Some examples further include editing the pixels corresponding to the object instance based on the edit command. Some examples of the method, apparatus, and non-transitory computer readable medium further include generating instance segmentation information based on the object features using an instance segmentation branch, wherein the instance segmentation branch is trained using a focal loss.

Figure 7:
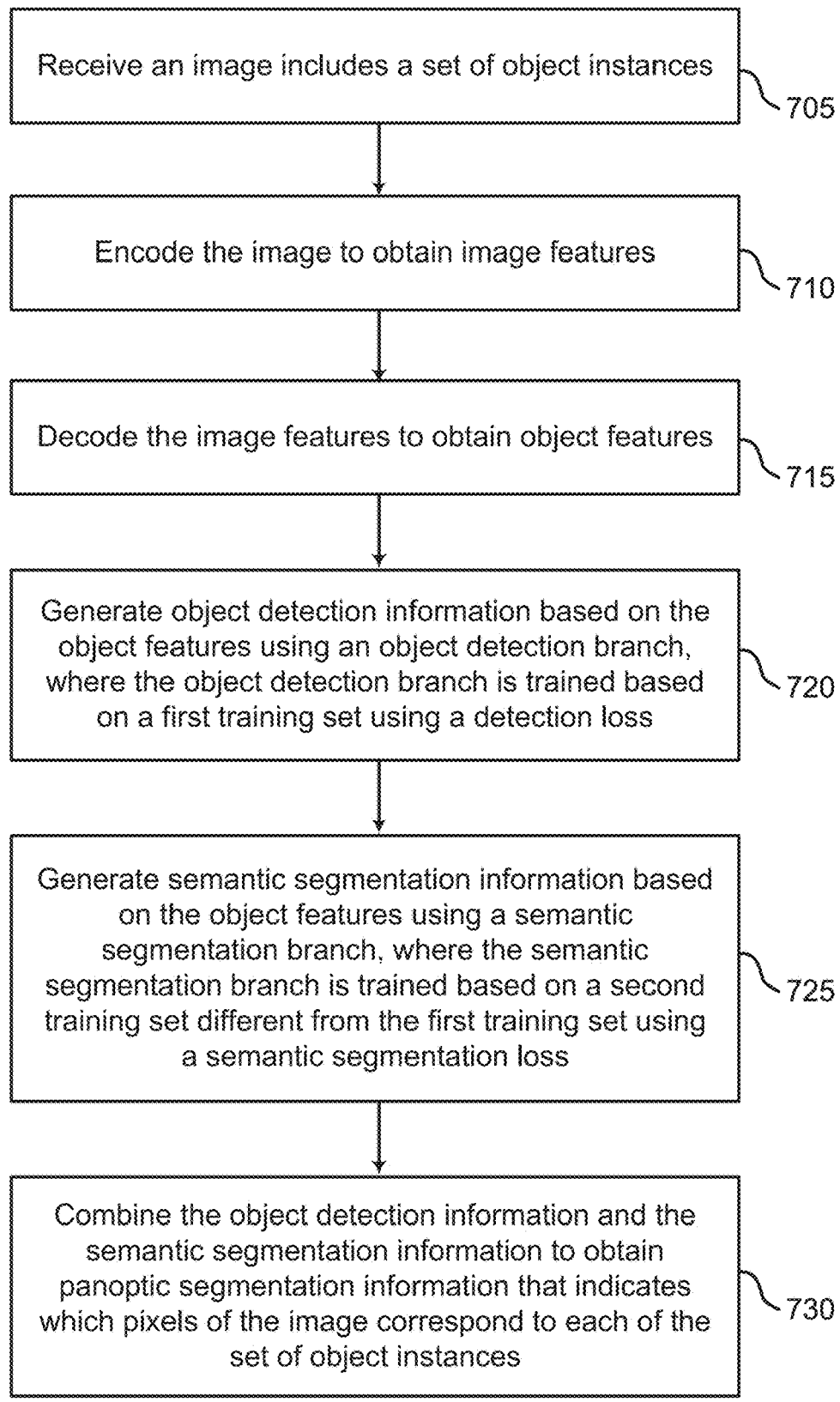
FIG. 7 shows an example of image processing using machine learning according to aspects of the present disclosure.

FIG. 7 shows an example of image processing using machine learning according to aspects of the present disclosure. Panoptic segmentation can be performed by the panoptic segmentation apparatus and its various components/networks as described in FIGS. 5-6. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives an image includes a set of object instances. In some cases, the operations of this step refer to, or may be performed by, a machine learning model as described with reference to FIG. 5. An original image (see FIG. 3) may include foreground things (e.g., person, motorcycle) and background stuff classes (e.g., sky, tree).

At operation 710, the system encodes the image to obtain image features. In some cases, the operations of this step refer to, or may be performed by, an image encoder as described with reference to FIGS. 5, 6, and 8-11. In some examples, an image encoder (e.g., feature pyramid network or FPN) can generate a feature pyramid for an input image. The feature pyramid includes a set of feature maps at different resolution levels. In some cases, feature pyramid network may identify a relative position representation of the combined feature map. Detail regarding operation of using an FPN to encode an image will be described in greater detail in FIGS. 8-11.

At operation 715, the system decodes the image features to obtain object features. In some cases, the operations of this step refer to, or may be performed by, a shared decoder as described with reference to FIGS. 5 and 6. In some examples, a shared decoder is used to decode the image features to obtain object features. Image features from the detection head (classification head) are input to a semantic segmentation branch and then the system obtains the segmentation result at global image level. Semantic segmentation branch shares the same backbone with object detector (i.e., information from object detector can help semantic segmentation).

At operation 720, the system generates object detection information based on the object features using an object detection branch, where the object detection branch is trained based on a first training set using a detection loss. In some cases, the operations of this step refer to, or may be performed by, an object detection branch as described with reference to FIGS. 5, 6, and 8. The object detection branch includes an object classification layer, a center detection layer, and a bounding box regression layer. Detail regarding the object detection branch will be described in FIG. 8. Training the object detection branch will be described in greater detail in FIGS. 12-14.

At operation 725, the system generates semantic segmentation information based on the object features using a semantic segmentation branch, where the semantic segmentation branch is trained based on a second training set different from the first training set using a semantic segmentation loss. In some cases, the operations of this step refer to, or may be performed by, a semantic segmentation branch as described with reference to FIGS. 6 and 9.

In some examples, a semantic segmentation branch is configured to generate semantic segmentation information based on the object features, where the semantic segmentation branch is trained based on a second training set different from the first training set using a semantic segmentation loss. The first training set is used to a train an instance segmentation branch. Detail regarding the semantic segmentation branch will be described in FIG. 9. Training the semantic segmentation branch will be described in greater detail in FIGS. 12-14.

At operation 730, the system combines the object detection information and the semantic segmentation information to obtain panoptic segmentation information that indicates which pixels of the image correspond to each of the set of object instances. In some cases, the operations of this step refer to, or may be performed by, a machine learning model as described with reference to FIG. 5.

Thus, detection and segmentation may be unified into a single comprehensive task to leverage possible complementarity. For example, semantic segmentation includes detecting all pixels in a scene, and instance segmentation includes delineating objects in defined classes. Accordingly, the "panoptic segmentation" task involves both semantic segmentation and instance segmentation to detect and delineate visible objects and regions in the scene.

Figure 8:
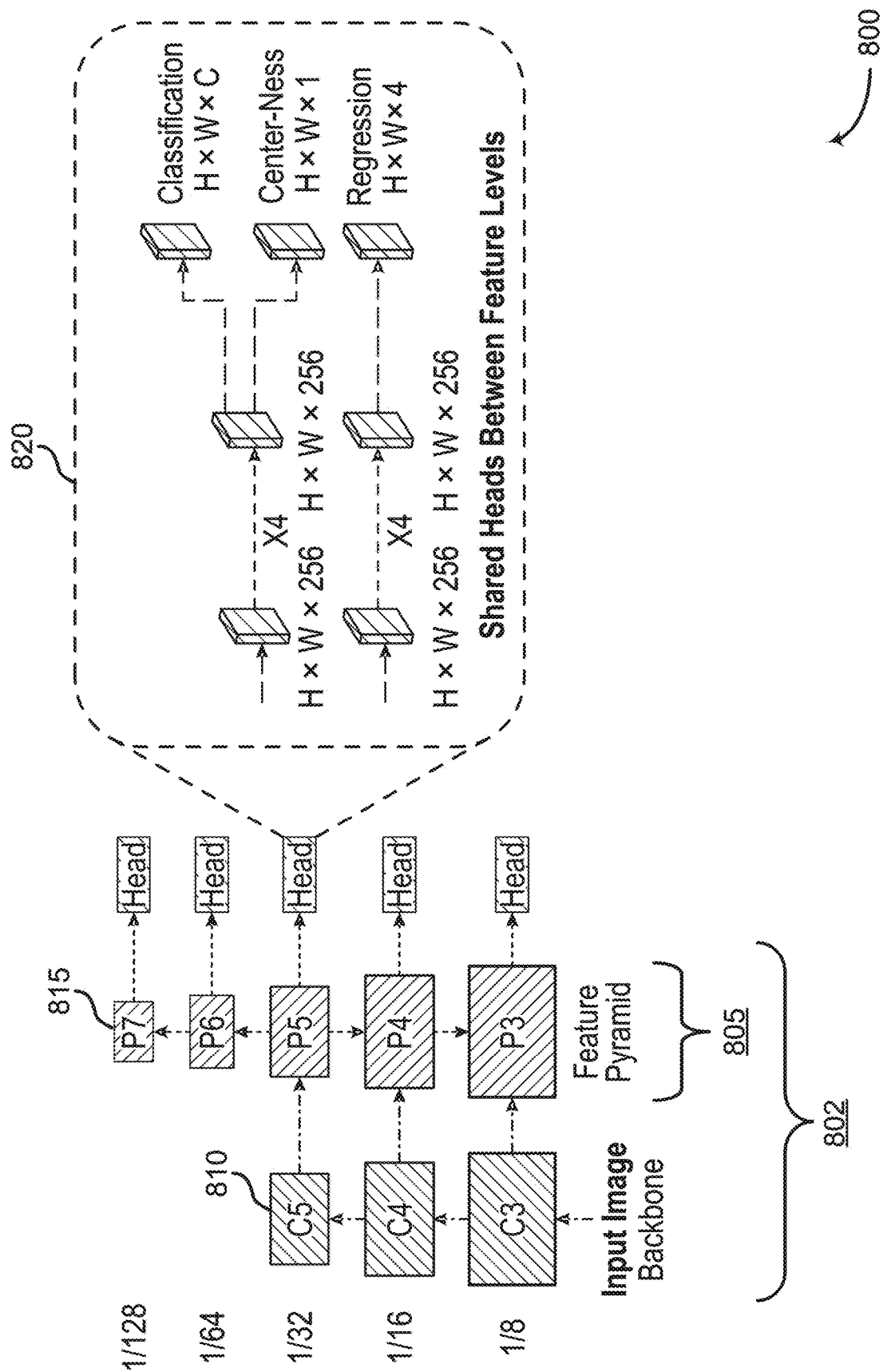
FIG. 8 shows an example of an object detection branch of a machine learning model according to aspects of the present disclosure.

FIG. 8 shows an example of an object detection branch 800 of a machine learning model according to aspects of the present disclosure. FIG. 8 illustrates the object detection branch 800 in greater detail as previously shown in FIG. 5. The example shown includes image encoder 802, convolutional layers 810, image features 815, shared head 820. In some examples, image encoder 802 includes a feature pyramid network 805.

According to an embodiment, image encoder 802 generates a feature pyramid for an input image. The feature pyramid includes a set of feature maps at different resolution levels. In some cases, image encoder 802 may identify a relative position representation of the combined feature map.

In some examples, feature pyramid network 805 may include a CNN. Additionally or alternatively, feature pyramid network 805 includes an attention module. In some cases, feature pyramid network 805 applies the attention module to the feature pyramid output of the image encoder 802 to produce an enhanced feature map. Feature pyramid network 805 then combines the enhanced feature map with each of the set of feature maps to produce an enhanced feature pyramid, and resizes each of the set of feature maps to a common resolution. Feature pyramid network 805 may then average each of the resized feature maps to produce a combined feature map, where the attention module is applied to the combined feature map.

Some examples of the feature pyramid network 805 may utilize top-down feature integration, while in other examples, bottom up feature integration may be used. Integrating features sequentially may dilute important semantic information contained in non-adjacent layers. Therefore, in some cases, the feature pyramid may be strengthened using the same balanced semantic features. When these enhanced features are used along with a standard FPN, a much richer feature pyramid can be obtained.

The machine learning model may use a feature pyramid network 805 to generate pyramidal feature representations. In some embodiments, these features may be enhanced using an attention network since both the instance head and semantic head share and utilize them. In one example, a feature pyramid may be enhanced using the same deeply integrated, balanced semantic features. Some embodiments may include four steps: rescaling, integrating, refining, and strengthening.

An FPN is a feature extractor that generates multiple feature map layers (multi-scale feature maps) for object detection. Each feature map layer corresponds to a different resolution. That is, each layer of the feature pyramid represents the image feature using an array with a different number of values. Image encoder 802 is an example of, or includes aspects of, the corresponding element described with reference to FIGS. 5, 6, and 9-11. Feature pyramid network 805 is an example of, or includes aspects of, the corresponding element described with reference to FIGS. 9-11. Convolutional layers 810 is an example of, or includes aspects of, the corresponding element described with reference to FIG. 9. Shared head 820 is an example of, or includes aspects of, the corresponding element described with reference to FIGS. 9-11. Object detection branch 800 is an example of, or includes aspects of, the corresponding element described with reference to FIGS. 5 and 6.

According to an embodiment of the present disclosure, the panoptic segmentation apparatus includes an object detection branch (e.g., DOMO detector). A DOMO detector is an efficient, real-time, and accurate on-device object detector. In some cases, the object detection branch includes a hierarchical classification head, focal loss for object prediction, and the object detection branch integrates data augmentation method (e.g., GridMask). As a result, the object detector has increased performance in object detection. In some examples, the object detector can be trained on a large-scale image classification, object detection, and visual relationship detection dataset (i.e., Open Images) to handle a large number of hierarchical object categories. The detection loss includes a center loss, a bounding box regression loss, and a classification loss (i.e., focal loss).

Figure 9:
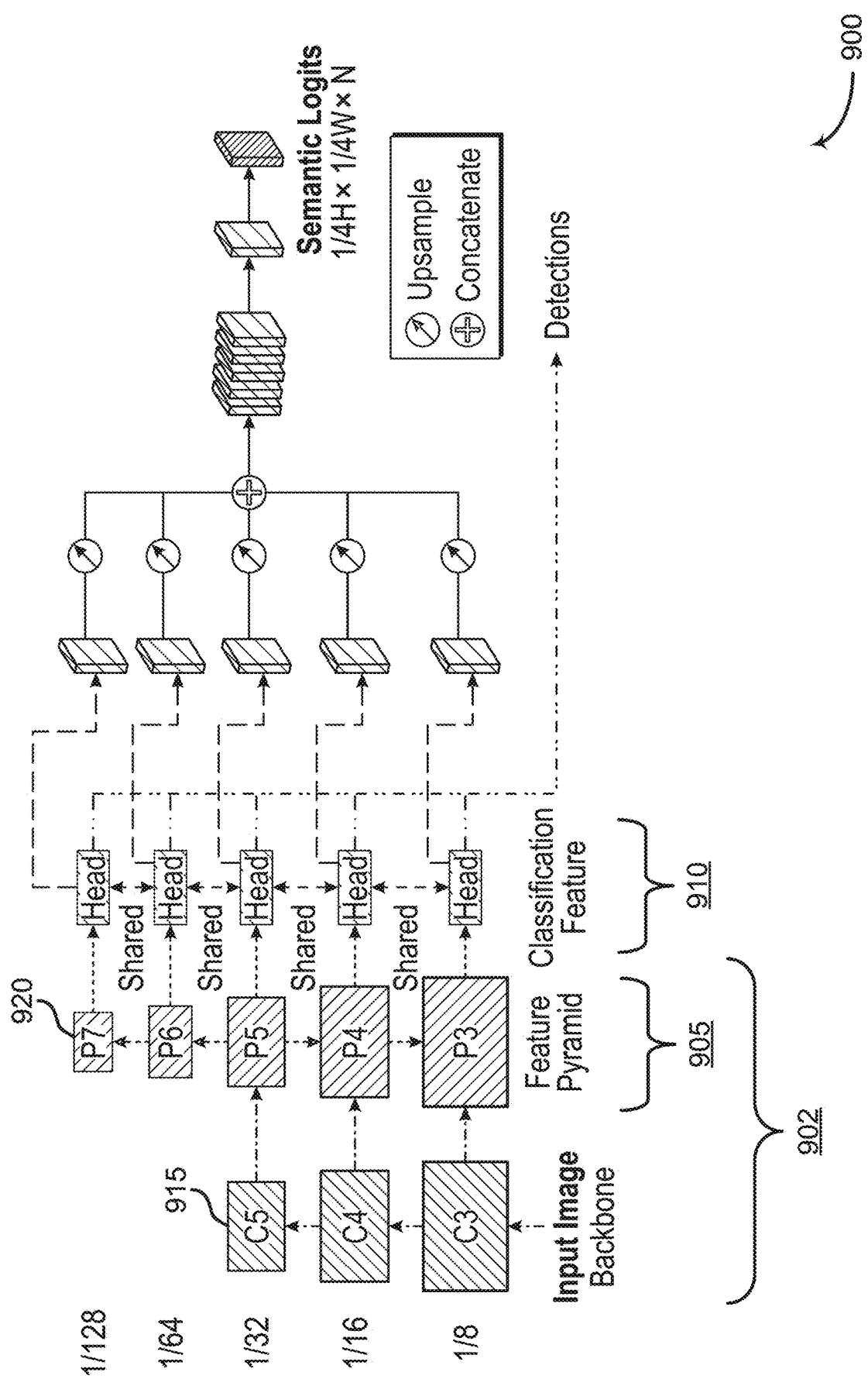
FIG. 9 shows an example of a semantic segmentation branch of a machine learning model according to aspects of the present disclosure.

FIG. 9 shows an example of a semantic segmentation branch 900 of a machine learning model according to aspects of the present disclosure. FIG. 9 illustrates the semantic segmentation branch 900 in greater detail as previously shown in FIG. 5. The example shown includes image encoder 902, feature pyramid network 905, shared head 910, convolutional layers 915, and image features 920. In some cases, semantic segmentation branch 900 may also be referred to as a stuff segmentation branch.

According to an embodiment of the present disclosure, the machine learning model adds a semantic segmentation branch 900 to an object detection branch or a detection backbone (e.g., DOMO detector). The features from the detection head (i.e., classification head) are input to the semantic segmentation branch 900 to obtain segmentation results at global image level. Semantic segmentation branch 900 shares the same backbone with the object detection branch. In some examples, information from the detector can help stuff segmentation. A dataset for scene understanding tasks such as semantic segmentation (e.g., COCO stuff dataset) is used to train the stuff segmentation branch. In some cases, the machine learning model learns segmentation without forgetting object detection. The feature is up-sampled from classification head to an intermediate size (e.g., H/4, W/4) and concatenated into a global feature F. The semantic label is predicted from F through a single convolutional layer and training is supervised by a cross entropy loss. A dice loss and focal loss are used to train the semantic segmentation branch 900.

Statistics of the detection head is processed for a batch normalization layer in the semantic segmentation branch 900. In some examples, the same mean and variance are used for object detection and semantic segmentation which saves GPU memory and aligns semantic segmentation training with detection training.

According to an embodiment, the machine learning model concatenates features (e.g., five feature maps on different scale, the machine learning model concatenates the channels of same size, height, width along a channel dimension). The concatenated output is then input to a convolution layer to produce a single feature map. Semantic logits are the output of semantic segmentation branch 900 (i.e., each pixel of the image is assigned a label). In some examples, the dimensions for semantic logits are H/4×W/4×N, where N is 80. For example, a "blue person" in an image may have three labels (object, semantics, instance).

Image encoder 902 is an example of, or includes aspects of, the corresponding element described with reference to FIGS. 5 and 6. Feature pyramid network 905 is an example of, or includes aspects of, the corresponding element described with reference to FIGS. 8, 10, and 11. Shared head 910 is an example of, or includes aspects of, the corresponding element described with reference to FIGS. 8, 10, and 11. Convolutional layers 915 is an example of, or includes aspects of, the corresponding element described with reference to FIG. 8. Image features 920 is an example of, or includes aspects of, the corresponding element described with reference to FIG. 8. Semantic segmentation branch 900 is an example of, or includes aspects of, the corresponding element described with reference to FIGS. 5 and 6.

Figure 10:
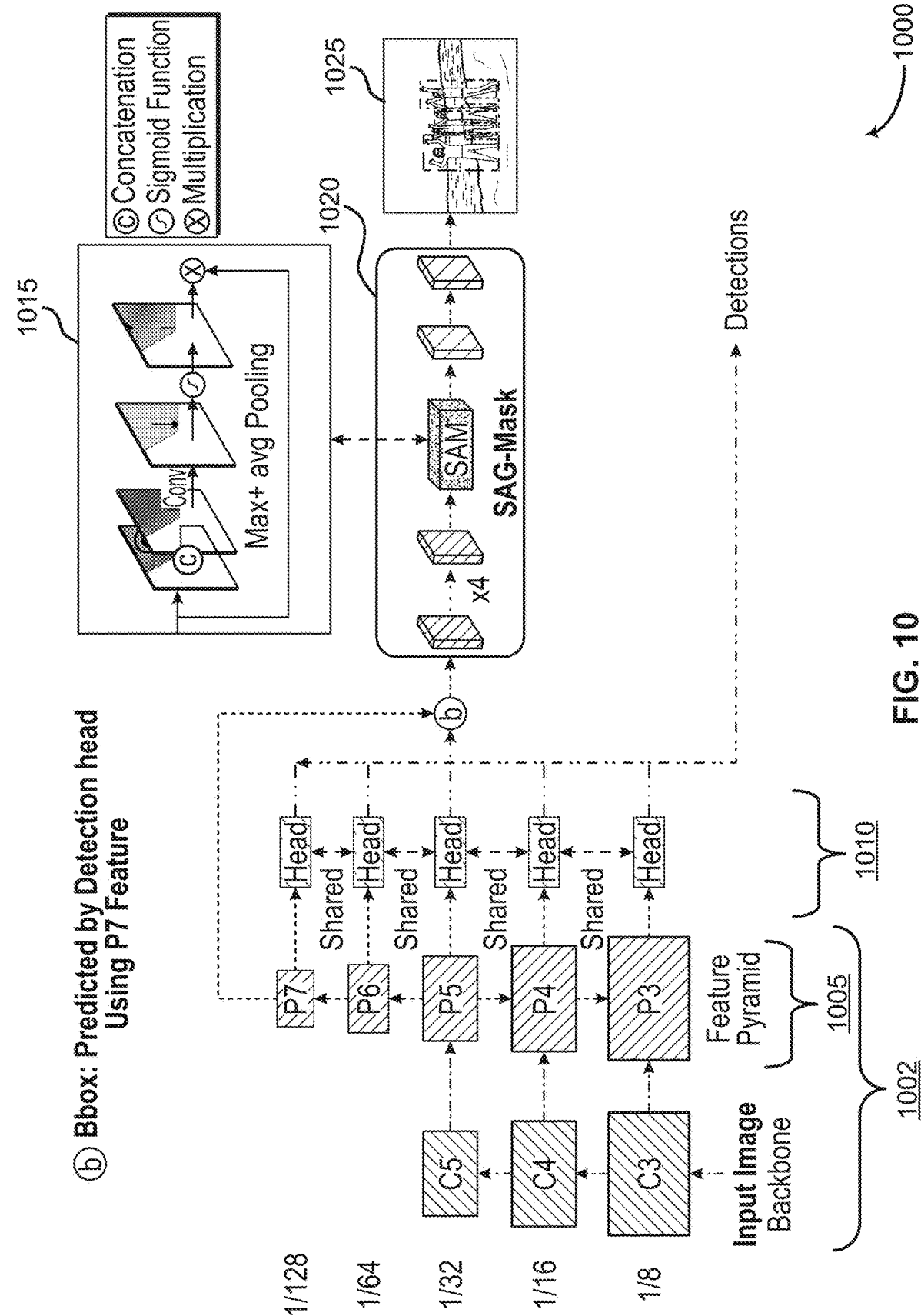
FIG. 10 shows an example of an instance segmentation branch of a machine learning model according to aspects of the present disclosure.

FIG. 10 shows an example of an instance segmentation branch 1000 of a machine learning model according to aspects of the present disclosure. FIG. 10 illustrates the instance segmentation branch 1000 in greater detail as previously shown in FIG. 5. The example shown includes image encoder 1002, feature pyramid network 1005, shared head 1010, pooling component 1015, SAG mask component 1020, and instance segmentation information 1025.

According to an embodiment of the present disclosure, the machine learning model adds an instance segmentation branch 1000 to the object detection branch mentioned previously. The features from the FPN are input to the instance segmentation branch 1000 to predict per-object mask. In some examples, features from an FPN are extracted using Region of Interest Align (RoI Align). RoI Align is an operation for extracting a small feature map from each RoI in detection and segmentation based tasks. It removes the harsh quantization of RoI Pool, properly aligning the extracted features with the input. To avoid any quantization of the RoI boundaries or bins, RoI Align uses bilinear interpolation to compute the exact values of the input features at four regularly sampled locations in each RoI bin, and the result is then aggregated (using max or average).

The features are input to the instance segmentation branch 1000 and then the machine learning model predicts per-object masks. The instance segmentation branch 1000 shares the backbone with the detection branch. In some cases, the RoI align is used to crop the features from different levels of the feature maps in FPN after the detection branch predicts object proposals. Additionally, the information from detector can help instance segmentation due to the same backbone shared by the instance segmentation branch 1000 and the object detection branch. In some examples, the instance segmentation branch 1000 is trained on Open Images dataset. Instance segmentation is learned without forgetting object detection. For example, an attention guided mask with anchor-free instance segmentation (i.e., SAG-Mask from CenterMask) may be used for instance segmentation branch 1000. Features inside the predicted RoI are extracted using RoI Align and fed sequentially into four convolutional layers and spatial attention module (SAM). For example, the features may be extracted at 14×14 resolution followed by a 2×2 de-convolution up-sampling of the feature map to 28×28. Next, a convolutional layer is applied for predicting instance masks. For example, a 1×1 convolutional layer may be used. In some cases, focal loss is used to train the instance segmentation branch 1000.

Image encoder 1002 is an example of, or includes aspects of, the corresponding element described with reference to FIGS. 5 and 6. Feature pyramid network 1005 is an example of, or includes aspects of, the corresponding element described with reference to FIGS. 8, 9, and 11. Shared head 1010 is an example of, or includes aspects of, the corresponding element described with reference to FIGS. 8, 9, and 11. SAG mask component 1020 is an example of, or includes aspects of, the corresponding element described with reference to FIG. 11. Instance segmentation branch 1000 is an example of, or includes aspects of, the corresponding element described with reference to FIG. 5.

Figure 11:
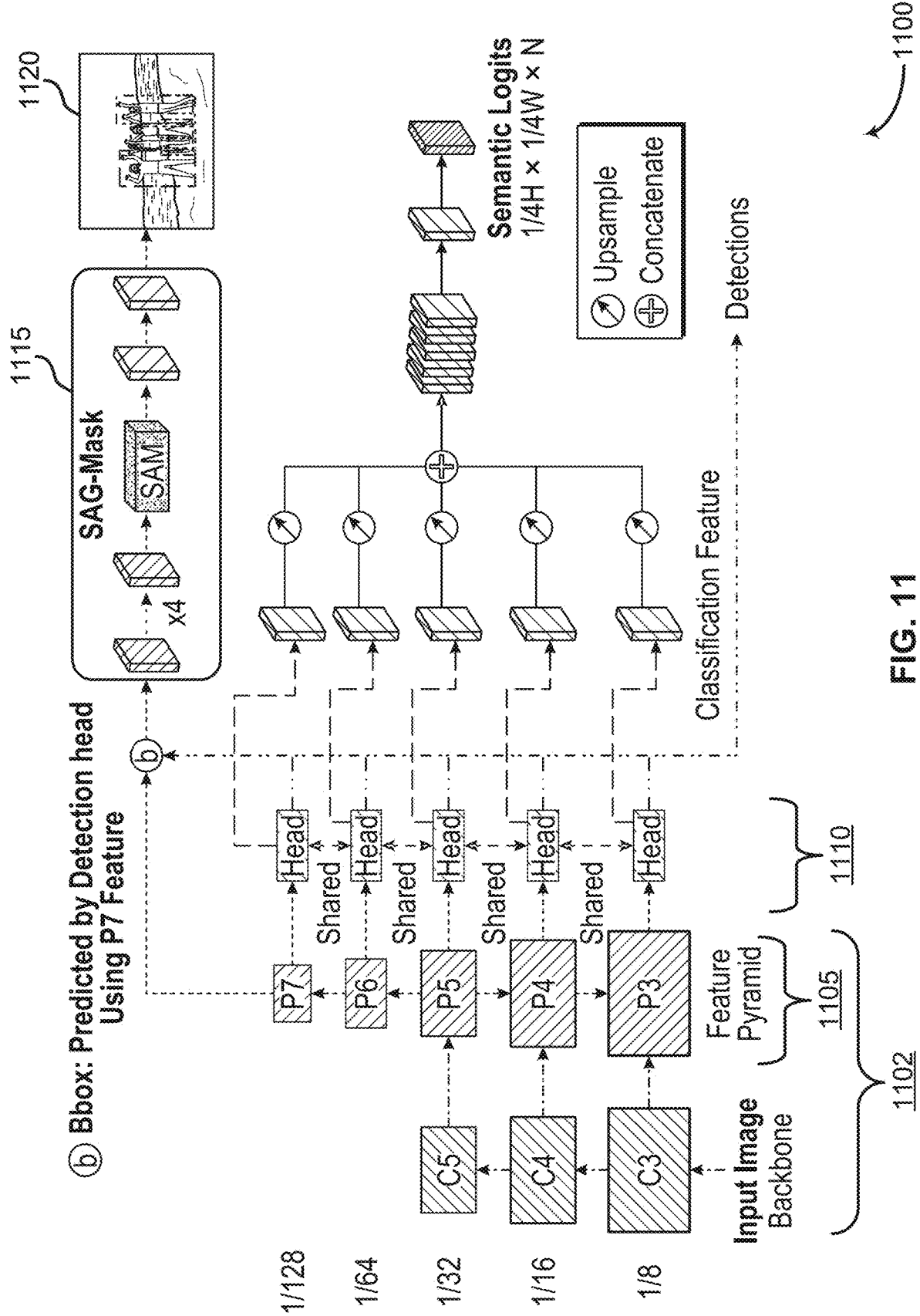
FIG. 11 shows an example of a panoptic segmentation model according to aspects of the present disclosure.

FIG. 11 shows an example of a panoptic segmentation model 1100 according to aspects of the present disclosure. The panoptic segmentation model 1100 combines an object detection branch, a semantic segmentation branch, and an instance segmentation branch. The example shown includes image encoder 1102, feature pyramid network 1105, shared head 1110, SAG mask component 1115, and instance segmentation information 1120.

Panoptic segmentation model 1100 corresponds to the machine learning model as described in FIG. 5. According to an embodiment, an object detection branch, a semantic segmentation branch, and an instance segmentation branch are combined together, i.e., the panoptic segmentation model 1100. The instance segmentation branch and semantic segmentation branch are trained together, along with a pre-trained object detector. In some examples, one or more of the instance segmentation branch, semantic segmentation branch, and object detector may be trained on different datasets. In some examples, two or more of the branches (e.g., the object detection branch and the instance segmentation branch) can be trained together using a dataset that includes both types of annotation information.

Image encoder 1102 is an example of, or includes aspects of, the corresponding element described with reference to FIGS. 5 and 6. Feature pyramid network 1105 is an example of, or includes aspects of, the corresponding element described with reference to FIGS. 8-10. Shared head 1110 is an example of, or includes aspects of, the corresponding element described with reference to FIGS. 8-10. SAG mask component 1115 is an example of, or includes aspects of, the corresponding element described with reference to FIG. 10.

Training and Evaluation

Figure 12:
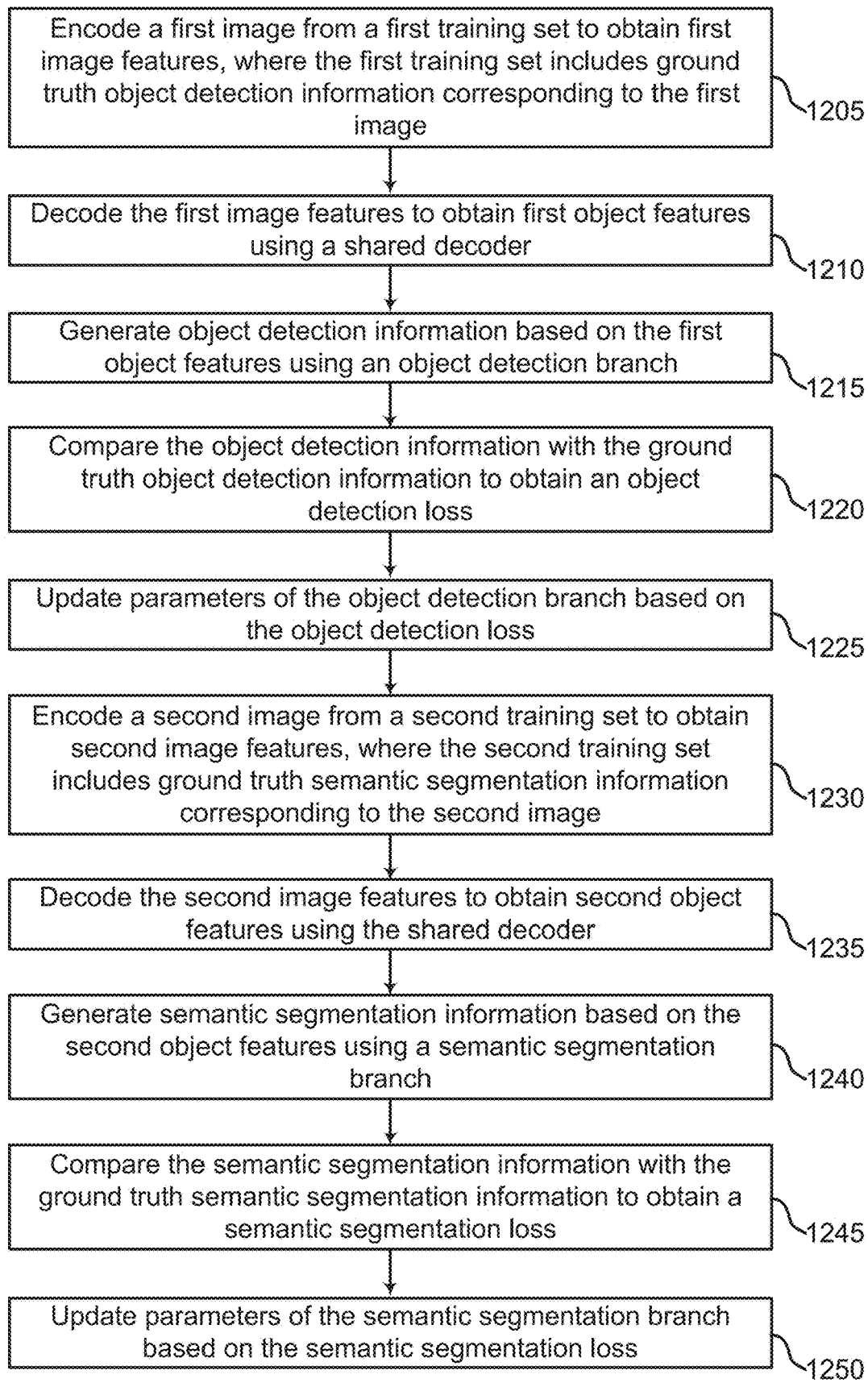
FIG. 12 shows an example of training a neural network according to aspects of the present disclosure.
Figure 13:
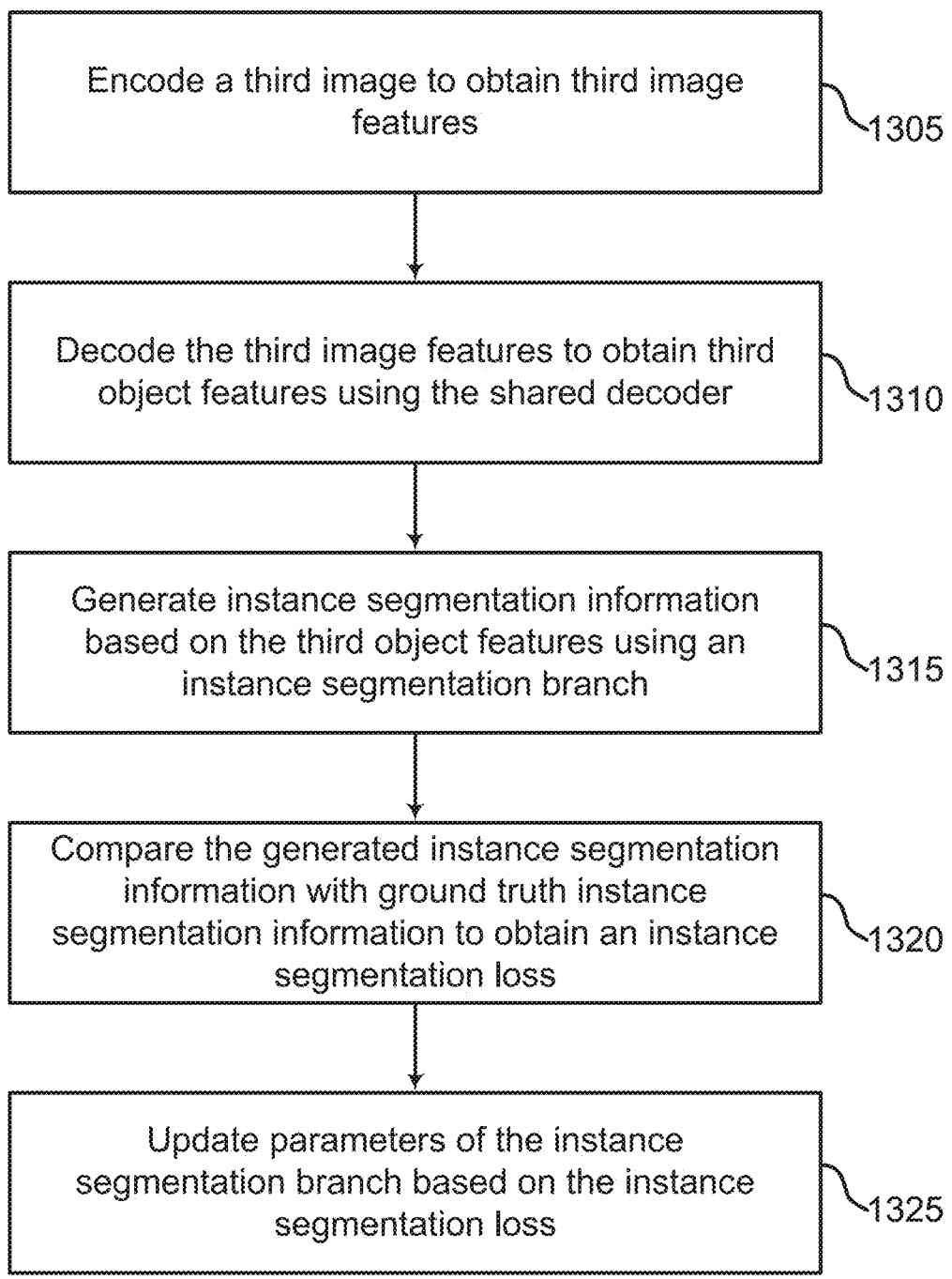
FIG. 13 shows an example of training an instance segmentation branch of a neural network according to aspects of the present disclosure.
Figure 14:
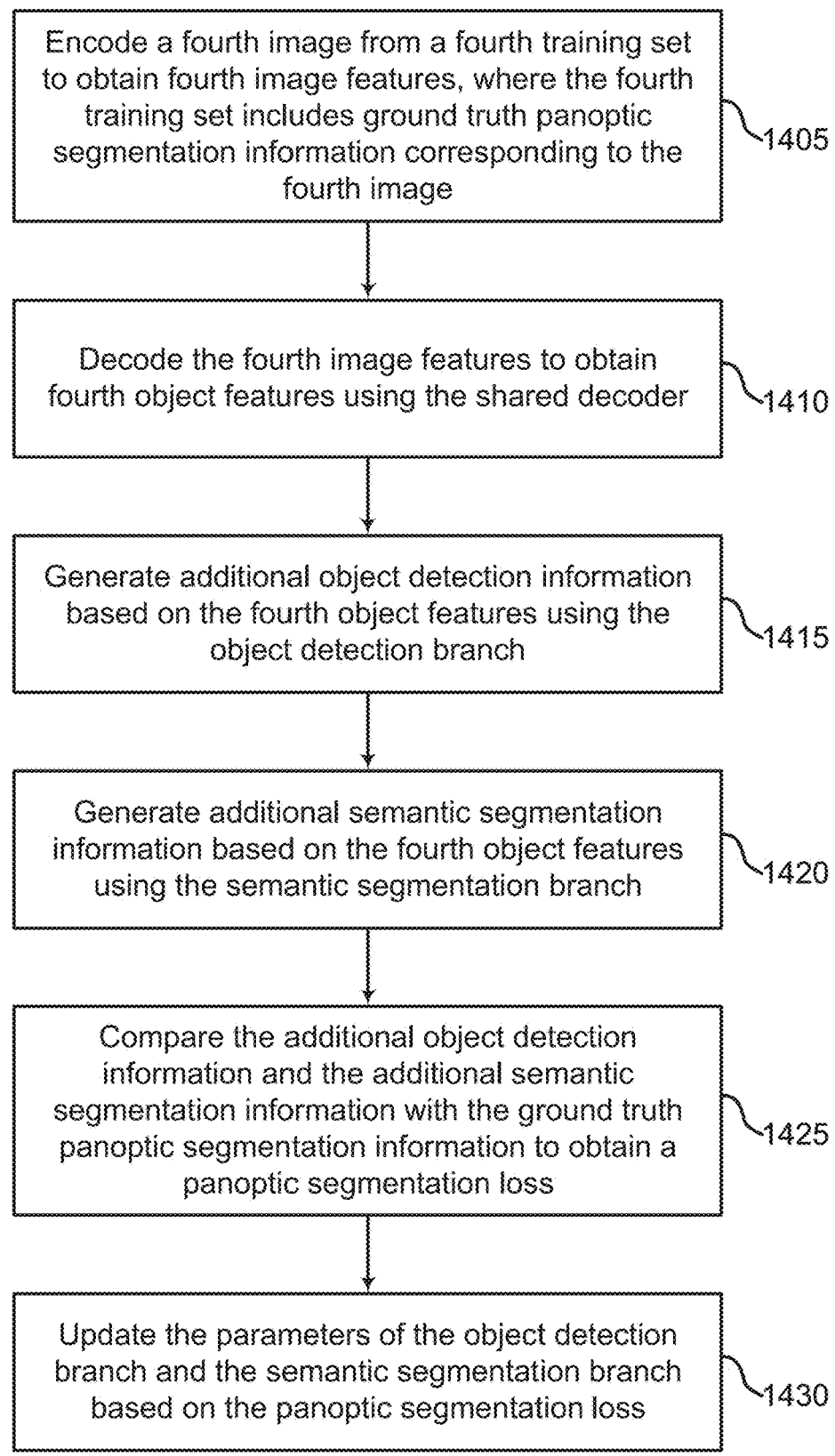
FIG. 14 shows an example of training an object detection branch and a semantic segmentation branch of a neural network according to aspects of the present disclosure.

In FIGS. 12-14, a method, apparatus, and non-transitory computer readable medium for training a neural network are described. One or more embodiments of the method, apparatus, and non-transitory computer readable medium include encoding a first image from a first training set to obtain first image features, wherein the first training set includes ground truth object detection information corresponding to the first image; decoding the first image features to obtain first object features using a shared decoder; generating object detection information based on the first object features using an object detection branch; comparing the object detection information with the ground truth object detection information to obtain an object detection loss; updating parameters of the object detection branch based on the object detection loss; encoding a second image from a second training set to obtain second image features, wherein the second training set includes ground truth semantic segmentation information corresponding to the second image; decoding the second image features to obtain second object features using the shared decoder; generating semantic segmentation information based on the second object features using a semantic segmentation branch; comparing the semantic segmentation information with the ground truth semantic segmentation information to obtain a semantic segmentation loss; and updating parameters of the semantic segmentation branch based on the semantic segmentation loss.

Some examples of the method, apparatus, and non-transitory computer readable medium further include updating parameters of the shared decoder based on the object detection loss.

Some examples of the method, apparatus, and non-transitory computer readable medium further include updating parameters of the shared decoder based on the semantic segmentation loss.

Some examples of the method, apparatus, and non-transitory computer readable medium further include encoding a third image to obtain third image features. Some examples further include decoding the third image features to obtain third object features using the shared decoder. Some examples further include generating instance segmentation information based on the third object features using an instance segmentation branch. Some examples further include comparing the generated instance segmentation information with ground truth instance segmentation information to obtain an instance segmentation loss. Some examples further include updating parameters of the instance segmentation branch based on the instance segmentation loss. In some examples, the third image and the ground truth instance information are from the first training set.

Some examples of the method, apparatus, and non-transitory computer readable medium further include updating parameters of the shared decoder based on the instance segmentation loss. In some examples, the object detection information includes object classification information, object center information, and bounding box information.

In some examples, the semantic segmentation information indicates a stuff category corresponding to individual pixels of the second image. In some examples, the ground truth object detection information from the first training set is based on a set of object categories. In some examples, the ground truth semantic segmentation information includes information that is based on a set of stuff categories.

Some examples of the method, apparatus, and non-transitory computer readable medium further include encoding a fourth image from a fourth training set to obtain fourth image features, wherein the fourth training set includes ground truth panoptic segmentation information corresponding to the fourth image. Some examples further include decoding the fourth image features to obtain fourth object features using the shared decoder. Some examples further include generating additional object detection information based on the fourth object features using the object detection branch. Some examples further include generating additional semantic segmentation information based on the fourth object features using the semantic segmentation branch. Some examples further include comparing the additional object detection information and the additional semantic segmentation information with the ground truth panoptic segmentation information to obtain a panoptic segmentation loss. Some examples further include updating the parameters of the object detection branch and the semantic segmentation branch based on the panoptic segmentation loss.

Some examples of the method, apparatus, and non-transitory computer readable medium further include generating additional instance segmentation information based on the fourth object features using an instance segmentation branch, wherein the panoptic segmentation loss is based on the additional instance segmentation information.

FIG. 12 shows an example of training a neural network according to aspects of the present disclosure. Training component in FIG. 5 is used to train the neural network. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1205, the system encodes a first image from a first training set to obtain first image features, where the first training set includes ground truth object detection information corresponding to the first image. In some cases, the operations of this step refer to, or may be performed by, an image encoder as described with reference to FIGS. 5, 6, and 8-11.

According to an embodiment of the present disclosure, the network model is trained on multiple different datasets. In some examples, Open Images and COCO stuff/semantic datasets are used for training the machine learning model. In one embodiment, the object detector and instance segmentation branch are trained on 105 object categories from Open Images, and the semantic segmentation branch is trained on 80 stuff categories from COCO stuff. For example, the training images may be resized to make the shorter side 640 pixels and the longer side less than or equal to 1,066 pixels.

A random horizontal flipping and data augmentation (i.e., GridMask) process can be applied to the training images. In some examples, the network model is trained for 150K iterations with a batch size of 16. The network model is trained on COCO stuff dataset using stochastic gradient descent (SGD) algorithm. For example, the algorithm uses 0.9 momentum and 0.00001 weight decay. In some examples, the initial learning rate is set to 0.01 and a cosine annealing learning rate scheduler is used.

At operation 1210, the system decodes the first image features to obtain first object features using a shared decoder. In some cases, the operations of this step refer to, or may be performed by, a shared decoder as described with reference to FIGS. 5 and 6.

At operation 1215, the system generates object detection information based on the first object features using an object detection branch. In some cases, the operations of this step refer to, or may be performed by, an object detection branch as described with reference to FIGS. 5, 6, and 8.

At operation 1220, the system compares the object detection information with the ground truth object detection information to obtain an object detection loss. In some cases, the operations of this step refer to, or may be performed by, a training component as described with reference to FIG. 5.

The term loss function or loss refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

At operation 1225, the system updates parameters of the object detection branch based on the object detection loss. In some cases, the operations of this step refer to, or may be performed by, a training component as described with reference to FIG. 5.

At operation 1230, the system encodes a second image from a second training set to obtain second image features, where the second training set includes ground truth semantic segmentation information corresponding to the second image. In some cases, the operations of this step refer to, or may be performed by, an image encoder as described with reference to FIGS. 5, 6, and 8-11.

In some examples, the object detection branch, semantic segmentation branch, and instance segmentation branch are jointly trained on multiple different datasets. Two datasets, i.e., Open Images and COCO stuff are used for training the different detection and/or segmentation branch. According to an embodiment, an instance segmentation branch and a semantic segmentation branch are added to an object detector (e.g., DOMO detector). The instance segmentation branch and semantic segmentation branch share parameters with the object detector. In some examples, the object detection branch and the instance segmentation branch are trained on Open Images dataset. The semantic segmentation branch is trained on COCO stuff dataset.

At operation 1235, the system decodes the second image features to obtain second object features using the shared decoder. In some cases, the operations of this step refer to, or may be performed by, a shared decoder as described with reference to FIGS. 5 and 6.

At operation 1240, the system generates semantic segmentation information based on the second object features using a semantic segmentation branch. In some cases, the operations of this step refer to, or may be performed by, a semantic segmentation branch as described with reference to FIGS. 5, 6 and 9. In some examples, the semantic segmentation branch is trained on 80 stuff categories from COCO stuff.

At operation 1245, the system compares the semantic segmentation information with the ground truth semantic segmentation information to obtain a semantic segmentation loss. In some cases, the operations of this step refer to, or may be performed by, a training component as described with reference to FIG. 5.

In some examples, the network model may be trained on COCO Panoptic dataset that includes 80 thing categories and 53 stuff categories. The network model is trained on COCO dataset using two models for initialization, i.e., ImageNet pretrained weights and multi-source model. The multi-source model is trained on Open Images dataset and COCO stuff dataset.

At operation 1250, the system updates parameters of the semantic segmentation branch based on the semantic segmentation loss. In some cases, the operations of this step refer to, or may be performed by, a training component as described with reference to FIG. 5.

FIG. 13 shows an example of training an instance segmentation branch of a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system encodes a third image to obtain third image features. In some cases, the operations of this step refer to, or may be performed by, an image encoder as described with reference to FIGS. 5, 6, and 8-11.

At operation 1310, the system decodes the third image features to obtain third object features using the shared decoder. In some cases, the operations of this step refer to, or may be performed by, a shared decoder as described with reference to FIGS. 5 and 6.

At operation 1315, the system generates instance segmentation information based on the third object features using an instance segmentation branch. In some cases, the operations of this step refer to, or may be performed by, an instance segmentation branch as described with reference to FIGS. 5 and 10. In some examples, the instance segmentation branch is trained on 105 object categories from Open Images.

At operation 1320, the system compares the generated instance segmentation information with ground truth instance segmentation information to obtain an instance segmentation loss. In some cases, the operations of this step refer to, or may be performed by, a training component as described with reference to FIG. 5.

At operation 1325, the system updates parameters of the instance segmentation branch based on the instance segmentation loss. In some cases, the operations of this step refer to, or may be performed by, a training component as described with reference to FIG. 5.

FIG. 14 shows an example of training an object detection branch and a semantic segmentation branch of a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system encodes a fourth image from a fourth training set to obtain fourth image features, where the fourth training set includes ground truth panoptic segmentation information corresponding to the fourth image. In some cases, the operations of this step refer to, or may be performed by, an image encoder as described with reference to FIGS. 5, 6, and 8-11.

At operation 1410, the system decodes the fourth image features to obtain fourth object features using the shared decoder. In some cases, the operations of this step refer to, or may be performed by, a shared decoder as described with reference to FIGS. 5 and 6.

At operation 1415, the system generates additional object detection information based on the fourth object features using the object detection branch. In some cases, the operations of this step refer to, or may be performed by, an object detection branch as described with reference to FIGS. 5, 6, and 8.

At operation 1420, the system generates additional semantic segmentation information based on the fourth object features using the semantic segmentation branch. In some cases, the operations of this step refer to, or may be performed by, a semantic segmentation branch as described with reference to FIGS. 5, 6 and 9.

At operation 1425, the system compares the additional object detection information and the additional semantic segmentation information with the ground truth panoptic segmentation information to obtain a panoptic segmentation loss. In some cases, the operations of this step refer to, or may be performed by, a training component as described with reference to FIG. 5.

At operation 1430, the system updates the parameters of the object detection branch and the semantic segmentation branch based on the panoptic segmentation loss. In some cases, the operations of this step refer to, or may be performed by, a training component as described with reference to FIG. 5.

In some examples, the semantic segmentation branch and instance segmentation branch are trained on the same COCO panoptic dataset. For example, the network model is trained on COCO using initialization setup from ImageNet pre-trained model and the multi-source model. In some cases, panoptic quality (PQ) is used as a metric for performance evaluation. PQ captures recognition and segmentation quality and treats both stuff and thing categories in a unified manner. In some examples, PQ values are used to report the performance on stuff and thing categories separately. Initialization from multi-source model can increase the performance of the network model. Quantitative results on COCO dataset are recorded.

In some examples, training the network model is based on COCO initialized from ImageNet pretrained weights. Training may also be based on COCO initialized from multi-source model.

Performance of apparatus, systems and methods of the present disclosure have been evaluated, and results indicate embodiments of the present disclosure have obtained increased performance over existing technology. Example experiments demonstrate that the panoptic segmentation apparatus outperforms conventional systems.

Experiments are conducted to evaluate the detection accuracy of the object detection branch and to analyze semantic segmentation performance of the panoptic segmentation apparatus. In some cases, detection accuracy when training the three tasks is competitive when compared to the object detection branch. Additionally, competitive semantic segmentation results are shown compared to existing models.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for training a neural network, comprising:
   encoding a first image from a first training set to obtain first image features, wherein the first training set includes ground truth object detection information corresponding to the first image;
   decoding the first image features to obtain first object features using a shared decoder;
   generating object detection information based on the first object features using an object detection branch;
   comparing the object detection information with the ground truth object detection information to obtain an object detection loss;
   updating parameters of the object detection branch based on the object detection loss;
   encoding a second image from a second training set to obtain second image features, wherein the second training set includes ground truth semantic segmentation information corresponding to the second image;
   decoding the second image features to obtain second object features using the shared decoder;
   generating semantic segmentation information based on the second object features using a semantic segmentation branch;

comparing the semantic segmentation information with the ground truth semantic segmentation information to obtain a semantic segmentation loss; and
updating parameters of the semantic segmentation branch based on the semantic segmentation loss.

2. The method of claim 1, further comprising:
updating parameters of the shared decoder based on the object detection loss.

3. The method of claim 1, further comprising:
updating parameters of the shared decoder based on the semantic segmentation loss.

4. The method of claim 1, further comprising:
encoding a third image to obtain third image features;
decoding the third image features to obtain third object features using the shared decoder;
generating instance segmentation information based on the third object features using an instance segmentation branch;
comparing the generated instance segmentation information with ground truth instance segmentation information to obtain an instance segmentation loss; and
updating parameters of the instance segmentation branch based on the instance segmentation loss.

5. The method of claim 4, wherein:
the third image and the ground truth instance segmentation information are from the first training set.

6. The method of claim 4, further comprising:
updating parameters of the shared decoder based on the instance segmentation loss.

7. The method of claim 1, wherein:
the object detection information includes object classification information, object center information, and bounding box information.

8. The method of claim 1, wherein:
the semantic segmentation information indicates a stuff category corresponding to individual pixels of the second image.

9. The method of claim 1, wherein:
the ground truth object detection information from the first training set is based on a set of object categories.

10. The method of claim 1, wherein:
the ground truth semantic segmentation information includes information that is based on a set of stuff categories.

11. The method of claim 1, further comprising:
encoding a fourth image from a fourth training set to obtain fourth image features, wherein the fourth training set includes ground truth panoptic segmentation information corresponding to the fourth image;
decoding the fourth image features to obtain fourth object features using the shared decoder;
generating additional object detection information based on the fourth object features using the object detection branch;
generating additional semantic segmentation information based on the fourth object features using the semantic segmentation branch;
comparing the additional object detection information and the additional semantic segmentation information with the ground truth panoptic segmentation information to obtain a panoptic segmentation loss; and
updating the parameters of the object detection branch and the semantic segmentation branch based on the panoptic segmentation loss.

12. The method of claim 11, further comprising:
generating additional instance segmentation information based on the fourth object features using an instance segmentation branch, wherein the panoptic segmentation loss is based on the additional instance segmentation information.

13. A method for image processing, comprising:
receiving an image comprising a plurality of object instances;
encoding the image to obtain image features;
decoding the image features to obtain object features;
generating object detection information based on the object features using an object detection branch, wherein the object detection branch is trained based on a first training set using a detection loss;
generating semantic segmentation information based on the object features using a semantic segmentation branch, wherein the semantic segmentation branch is trained based on a second training set different from the first training set using a semantic segmentation loss; and
combining the object detection information and the semantic segmentation information to obtain panoptic segmentation information that indicates which pixels of the image correspond to each of the plurality of object instances.

14. The method of claim 13, further comprising:
receiving a search query indicating an object corresponding to an object instance of the plurality of object instances;
retrieving the image in response to the search query based on the panoptic segmentation information; and
presenting the image and at least a portion of the panoptic segmentation information corresponding to the object instance for display.

15. The method of claim 13, further comprising:
receiving a selection command corresponding to an object instance of the plurality of object instances;
selecting pixels corresponding the object instance based on the selection command;
receiving an edit command; and
editing the pixels corresponding to the object instance based on the edit command.

16. The method of claim 13, further comprising:
generating instance segmentation information based on the object features using an instance segmentation branch, wherein the instance segmentation branch is trained using a focal loss.

17. An apparatus for image processing, comprising:
an image encoder configured to encode an image to obtain image features;
a shared decoder configured to decode the image features to obtain object features;
an object detection branch configured to generate object detection information based on the object features, wherein the object detection branch is trained based on a first training set using a detection loss; and
a semantic segmentation branch configured to generate semantic segmentation information based on the object features, wherein the semantic segmentation branch is trained based on a second training set different from the first training set using a semantic segmentation loss.

18. The apparatus of claim 17, further comprising:
an instance segmentation branch configured to generate instance segmentation information based on the object features, wherein the instance segmentation branch is trained using a focal loss.

19. The apparatus of claim 17, wherein:
the object detection branch comprises an object classification layer, a center detection layer, and a bounding box regression layer.

20. The apparatus of claim 17, wherein:
the image encoder comprises a feature pyramid network (FPN).

\* \* \* \* \*